(12) United States Patent
Hornick et al.

(10) Patent No.: US 12,530,818 B2
(45) Date of Patent: Jan. 20, 2026

(54) METHODS AND SYSTEMS FOR OPTIMIZING AN IMAGE GENERATOR

(71) Applicant: DigiM Solution LLC, Woburn, MA (US)

(72) Inventors: Timothy Hornick, Albuquerque, NM (US); Shuang Zhang, Winchester, MA (US)

(73) Assignee: DigiM Solution LLC, Woburn, MA (US)

( * ) Notice: Subject to any disclaimer, the term of this patent is extended or adjusted under 35 U.S.C. 154(b) by 236 days.

(21) Appl. No.: 18/394,783

(22) Filed: Dec. 22, 2023

(65) Prior Publication Data

US 2024/0212227 A1    Jun. 27, 2024

Related U.S. Application Data

(60) Provisional application No. 63/476,660, filed on Dec. 22, 2022.

(51) Int. Cl.
*G06T 11/00*        (2006.01)
*G06T 5/10*         (2006.01)
(Continued)

(52) U.S. Cl.
CPC ............... *G06T 11/00* (2013.01); *G06T 5/10* (2013.01); *G06T 7/12* (2017.01); *G06V 10/761* (2022.01);
(Continued)

(58) Field of Classification Search
None
See application file for complete search history.

(56) References Cited

U.S. PATENT DOCUMENTS 11,081,212 B2     8/2021   Zhang
2021/0271867 A1*  9/2021   Liu ..................... G06N 3/0455
(Continued)

FOREIGN PATENT DOCUMENTS

WO     2024/138171 A1    6/2024

OTHER PUBLICATIONS

Bergmann, U., et al., "Learning Texture Manifolds with the Periodic Spatial GAN", Proceedings of the 34th International Conference on Machine Learning, Sep. 8, 2017, 10 pages.
(Continued)

*Primary Examiner* — Edward Martello
(74) *Attorney, Agent, or Firm* — Hamilton, Brook, Smith & Reynolds, P.C.

(57) ABSTRACT

Embodiments are directed to methods and systems that generate images with structural features, including microstructures, from exemplar images. Such embodiments use an image generator steered by input attributes to generate structural features of synthetic images with the specified input attributes. The generated attributes can either accurately match the exemplar attributes or vary according to user control, without being limited to attribute combinations that are represented in the exemplar data. This enables extrapolation to novel structures that can be generated, analyzed, and optimized in silico without incurring additional data acquisition costs, e.g., costs for manufacturing, sample preparation, imaging, and/or segmentation. Embodiments enable accurate synthesis of images with target attributes of structure features, including on larger spatial domains, higher dimensions, and attributes not directly controlled or supervised during model training. Embodiments have wide applications in structure engineering, including pharmaceutical development and material science.

20 Claims, 16 Drawing Sheets

(51) Int. Cl.
G06T 7/12 (2017.01)
G06V 10/74 (2022.01)
G06V 10/764 (2022.01)

(52) U.S. Cl.
CPC .. *G06V 10/764* (2022.01); *G06T 2207/20084* (2013.01)

(56) References Cited

U.S. PATENT DOCUMENTS

2022/0028139 A1* 1/2022 Mitra ............... G06N 3/0499
2022/0383617 A1* 12/2022 Blaiotta ............ G06V 10/7715

OTHER PUBLICATIONS

Chen, W., et al., "MO-PaDGAN: Reparameterizing Engineering Designs for augmented multi-objective optimization", Applied Soft Computing, vol. 113, part A, Dec. 2021, 21 pages.

Cohen, M. F., et al., "Wang Tiles for image and texture generation", ACM Transactions on Graphics, vol. 22, No. 3, Jul. 1, 2003, 8 pages.

Ding, X., et al., "CcGAN: Continuous Conditional Generative Adversarial Networks for Image Generation ", ICLR, 2021, 30 pages.

Dosovitskiy, A., "You Only Train Once: Loss-Conditional Training of Deep Networks ", ICLR, 2020, 17 pages.

Gatys, L. A., et al., "A Neural Algorithm of Artistic Style", arXiv:1508.06576v2 [cs. CV], Sep. 2, 2015, 16 pages.

Goodfellow, I. J., et al., "Generative Adversarial Nets", Advances in Neural Information Processing Systems 27 (NIPS 2014), Jun. 10, 2014, 9 pages.

Gutierrez, J., et al., "On Demand Solid Texture Synthesis Using Deep 3D Networks", prearXiv: 2001.04528v1 [cs.GR], Jan. 13, 2020, 19 pages.

Heeger, D. J., et al., "Pyramid-Based Texture Analysis/Synthesis", ACM, 1995, 10 pages.

Karras, T., et al., "A Style-Based Generator Architecture for Generative Adversarial Networks", Proceedings of the IEEE/CVF Conference on Computer Vision and Pattern Recognition (CVPR), 2019, pp. 4401-4410.

Mirza, M., et al., "Conditional Generative Adversarial Nets", arXiv:1411.1784v1 [ cs.LG], Nov. 6, 2014, 7 pages.

Miyato, T., et al., "cGANs with Projection Discriminator", ICLR, 2018, 21 pages.

Nobari, A. H., et al., "PcDGAN: A Continuous Conditional Diverse Generative Adversarial Network For Inverse Design", arXiv:2106.03620v1 [cs.LG], Jun. 7, 2021, 12 pages.

Wei, L. Y., et al., "Fast Texture Synthesis using Tree-structured Vector Quantization", SIGGRAPH '00: Proceedings of the 27th annual conference on Computer graphics and interactive techniques, Jul. 2000, 10 pages.

Zhao, X., et al., "STS-GAN: Can We Synthesize Solid Texture with High Fidelity from Arbitrary 2D Exemplar?", arXiv:2102.03973v6 [cs.CV], Aug. 20, 2022, 9 pages.

Zhou, Y., et al., "Non-Stationary Texture Synthesis by Adversarial Expansion", arXiv:1805.04487v1 [cs. GR], May 11, 2018, 13 pages.

International Search Report and Written Opinion received for PCT Patent Application No. PCT/US2023/085775, mailed on May 28, 2024, 15 pages.

Juhwan Noh, "Inverse Design of Solid-State Materials via a Continuous Representation" Matter, vol. 1, No. 5, Nov. 6, 2019, pp. 1370-1384.

Long, T., et al., "nverse design of crystal structures for multicomponent systems", Acta Materialia, vol. 231, Jun. 1, 2022, 10 pages.

Zhang, H., et al., "ScaffoldGAN: Synthesis of Scaffold Materials based on Generative Adversarial Networks", Computer-Aided Design, vol. 138, Sep. 2021, 12 pages.

\* cited by examiner

METHODS AND SYSTEMS FOR OPTIMIZING AN IMAGE GENERATOR

RELATED APPLICATION

This application claims the benefit of U.S. Provisional Application No. 63/476,660, filed on Dec. 22, 2022. The entire teachings of the above application are incorporated herein by reference.

BACKGROUND

A structure is an arrangement of matter. A structure image is an image representation of a structure. An attribute is a description of a structure, often quantitative. An attribute evaluator can empirically or algorithmically determine an attribute of a structure, potentially using other attributes from other attribute evaluators.

Structure engineering is a process of adjusting at least one attribute of a structure to observe the adjustment's effects on at least one other attribute, e.g., the amount that permeability (how effectively fluid passes through the structure) increases when porosity (air void space) of a porous structure increases by 10%.

Structure engineering can search for a set of input attributes (referred to as properties interchangeably hereafter, e.g., porosity), that produce a set of target attributes (referred to as performances interchangeably hereafter, e.g., permeability).

Computer-aided structure engineering has been utilized in optimizing simple structures. However, the complexity of microstructures in products for pharmaceutical, food, energy, and material applications has required optimizing in the physical world, which is a slow, tedious, and expensive process of trial and error. Each search step may include developing or modifying a manufacturing process, producing a structure to meet desired input attributes in a quality-controlled manner, and determining the structure's performance through experiments. The experiments can require an arbitrarily long amount of time to produce results, e.g., for long-acting drug products where release profiles are measured in months, and arbitrarily many iterations of experiments may be required to discover a structure with the correct properties to sustain performance, e.g., therapeutic performance. Therefore, minimizing the amount of physical manufacturing and experimentation is essential to accelerating structure engineering.

Structure images have already proven effective at reducing physical experimentation requirements, with in silico processing and simulations evaluating attributes in a fraction of the time and often at higher accuracy [16] (bracketed numbers in this document refer to the enumerated list of references hereinbelow). However, collecting structure images from physical samples still requires time and expense on top of manufacturing of the samples to be imaged. Thus, the structure images of physical samples should be collected purposefully and reused thoroughly.

Structure image generation can dramatically reduce an amount of structure images that must be collected by producing images in silico to analyze. However, a structure image generation method should be capable of generating structures with novel attributes while maintaining essential characteristics of exemplar structures, e.g., if the exemplar structure consists of a porous structure compacted from crystalline particles, a generated structure with a higher porosity should consist of these same particles, rather than e.g., spheres, and dispersed in a similar morphology rather than truly random.

A Generative Adversarial Network (GAN) is a generative deep learning model, i.e., a collection of convolution neural networks, that creates synthetic variations of an exemplar dataset that maintains some features of the exemplar dataset.

SUMMARY

Example embodiments are directed to methods, systems, and computer program products that generate images with structural features, including microstructures. Embodiments may generate images with structural features from exemplar images. Embodiments can use a multi-objective deep-learning approach with a generator steered by input attributes. The attributes of generated structures, i.e., generated structure images, can accurately match exemplar attributes or vary according to user control. Moreover, the attributes of generated structures are not limited to attribute combinations that are represented in exemplar data. This enables embodiments to extrapolate to novel structures that can be analyzed in silico without incurring additional data acquisition costs, e.g., costs for manufacturing, sample preparation, imaging, and/or segmentation. Some embodiments utilize equivariant image generators to generate continuous structures of higher dimension (e.g., 2D spatial to 3D spatial or 2D spatial to 2D plus temporal), larger spatial extents (e.g., from an exemplar image with 100 by 100 pixels to an output image with 1,000 by 1,000 pixels), and with controlled spatial attribute variation. Embodiments enable accurate synthesis of target attributes by meta-inference, including on larger or higher dimension structures and attributes not directly controlled or supervised during model training Embodiments have wide applications in structure engineering, including pharmaceutical development and material science.

Conventional image generation methods are significantly limited for structure image generation in speed, precision, accuracy, interpretability, quality, and the amount of exemplar images that must be collected, i.e., their ability to extrapolate to novel attributes. The limitations render the conventional methods insufficient for effective structure engineering.

For example, various machine learning and probabilistic algorithms, including Pyramid Histogram Matching [1], Tree-Structured Vector Quantization [2], and Gram Matrix Style Transfer with Neural Networks [3], attempted to automate a process of detecting and reproducing patterns with stochastic variation, but often at great computational cost and with limited success. Tile-stitching approaches like Wang Tiles [4] are faster and more stable, but lack output diversity and offer little control. None of these existing methods reliably generate realistic microstructure properties nor demonstrate performance validation without substantial manual effort.

The deep-learning field has more recently produced methods of generating generic images, including images of structures, using gradient optimization of neural networks on a plurality of exemplar images. The most common methods include Variational Autoencoders (VAEs), Generative Adversarial Networks (GANs), and Denoising Diffusion models. These methods are implementations of the same essential solutions to two fundamental problems.

The first fundamental problem is how to generate samples belonging to a complex distribution, where "complex" means intractable to describe empirically and therefore impossible to write an algorithm to sample from directly.

The methods solve this problem by instead sampling from a simple distribution with a defined algorithm, e.g., pseudo-random noise, and applying a function that transforms that input sample into a sample from the desired distribution.

The transformation function is produced by first defining a parameterized function with correct input and output shapes, e.g., a vector of N input values and a grid of W×H output values, i.e., an image, then optimizing parameters of the function to ensure that for all possible inputs, the corresponding output is within the desired complex distribution.

However, that optimization needs a definition of the complex distribution, for which no such definition exists. This is the second fundamental problem that the methods solve, by learning an approximate definition of the complex distribution from a plurality of exemplar samples that are defined as belonging to the complex distribution. With sufficient exemplar samples and careful implementation, the learned approximation will correctly interpolate the exemplar samples to generate similar novel samples.

This interpolation of exemplar samples cannot, in general, produce entirely novel samples, e.g., if the exemplar samples consisted entirely of black-and-white images, the learned distribution will not contain any color images regardless of a user's desires, and thus a transformation function optimized to sample from the learned distribution will be incapable of producing color images. Similarly, the interpolation has a limited range, i.e., if the exemplar samples consisted entirely of red images and cyan images, i.e., opposite colors, the transformation function optimized for the learned distribution will not, for any input, produce a purple image, i.e., an unrepresented midpoint of the exemplar range.

Of the deep-learning methods, GANs illustrate a concept of learning an approximation of the target distribution most directly. A GAN includes two modules, a generator and a discriminator, typically implemented as multi-layer neural networks.

The generator is configured to fulfill the role of the transformation function, i.e., transform inputs into samples from a target distribution.

The discriminator is configured to fulfill the role of the learned approximation, specifically by estimating a probability that a given input belongs to a target distribution. For exemplar samples, the "true" probability is defined as 1, and for generated samples, the "true" probability is defined as 0.

During training, the generator's objective is to increase the probability as estimated by the discriminator that the generated samples belong to the target distribution. Meanwhile, the discriminator's objective is to minimize its estimated probability for generated samples and maximize its estimated probability for exemplar samples. The generator's and the discriminator's objectives of maximization and minimization are in direct conflict, hence why GANs are "adversarial."

The original GAN architecture has been extended to generate images satisfying some specific attributes. The earliest "conditional" GANs [6] sampled images from discrete classes (e.g., "dog," "cat," "plane") specified by a user. Later methods such as StyleGAN [7] smoothly interpolated between classes by extracting "style" vectors from existing images, which encode attributes of the image. However, these style vectors are a "black box," with no meaning to a human user nor a scientific/engineering application. An additional transformation function must be learned to map the style vector to meaningful controls for a user—a task that is computationally expensive and algorithmically convoluted.

The Continuous-Conditional (cc)-GAN [8] addresses that issue by employing user-specified scalar controls instead of reverse-engineering meaning from style vectors. The MO-PaDGAN [10] and PcDGAN [11] architectures expand on the ccGAN to improve the accuracy and diversity of generated samples in multi-objective inverse design problems. However, none of these methods are configured to extrapolate beyond attributes of exemplars.

Deep learning applications for texture generation, where textures are analogous to structure images, have made rapid progress, several of which are reviewed below and synergistically utilized in developing an embodiment of this disclosure.

The first such application employed Non-Stationary Texture Synthesis by Adversarial Expansion [12]. "Non-stationary" textures exhibit random or periodic fine details in some larger arrangement. This method "expands" such a texture by training a network to enlarge an original image with realistic textures.

Although the network usually learns that local attribute variations are expandable arrangements, the expansion of those variations regresses to the mean attributes of the whole image and, thus, local variations diminish as an output image size increases. Further, the need to re-run the network on an entire image for each doubling of output size dramatically increases runtime. The network only learns three-dimensional (3D) structures if it is trained on 3D images, which limits practical application due to both 3D image availability and training hardware requirements. Lastly, generating a larger image requires combining overlapping tiles, creating visible discontinuities in an output image.

One other method for non-stationary synthesis is the Periodic Spatial GAN [13], which gives more direct control over what texture attributes occur where. However, Periodic Spatial GAN [13] needs complex spatial inputs, and only blends between individual textures, resulting in suboptimal quality.

Solid Texture Synthesis (STS) [14] addresses many technical drawbacks of Texture Expansion. STS uses far fewer computing resources to train because STS can learn higher-dimensional textures from lower-dimensional slices. This enables training on larger slices, which dramatically improves realism for structure images. It also allows creating isotropic textures from anisotropic ones and vice versa. This homogenization is desirable in some imaging datasets where a third dimension is more prone to artifacts or resolution reduction, such as images acquired via focused ion beam scanning electron microscopy. STS is also fully equivariant, meaning that it represents an infinite texture field that can be sampled at any location, in any order, and of any size.

However, the original STS implementation and a later variation using a GAN approach [15] did not provide conditional control over output attributes.

Embodiments solve the foregoing problems of existing texture synthesis and deep-learning methods to provide functionality for structure engineering.

An example embodiment is directed to a method of optimizing an image generator to generate images with specified attributes of structural features. The method includes selecting input attribute(s) from an input structural feature attribute distribution. The method further includes producing an output image by processing the selected input attribute(s) with the image generator. The method further includes determining a similarity score of the output image by processing the output image based on a similarity objective. The determined similarity score represents qualitative similarity of the output image to exemplar images. The method further includes determining an attribute score of the output image by processing the output image and the selected input attribute(s) based on an attribute objective. The determined attribute score represents quantitative similarity of attributes of the output image to the selected input attribute(s). The method further includes, based on the determined similarity score and the determined attribute score, optimizing the image generator to produce images, based on the selected input attribute(s), with increased similarity scores and attribute scores. The method further includes iterating the selecting, producing, determining the similarity score, determining the attribute score, and optimizing until a threshold is met. It is noted that, in an example embodiment, images generated by the image generator with the specified attributes of the structural features may not be limited to those images within the exemplar images. According to another example embodiment, the input structural feature attribute distribution may be outside a structural feature attribute distribution of the exemplar images. Further, in yet another example embodiment, the structural feature attributes of the output image may be outside the structural feature attribute distribution of the exemplar images.

According to an example embodiment, determining the attribute score of the output image by processing the output image and the selected input attribute(s) may include processing the output image with a classifier to determine classifier estimated values of the attributes of the output image. In another example embodiment, determining the attribute score of the output image by processing the output image and the selected input attribute(s) may further include processing the classifier estimated values of the attributes of the output image and the selected input attribute(s) based on the attribute objective to determine classification loss representing inaccuracy of the output image to the selected input attribute(s). According to an example embodiment, the classification loss may be the determined attribute score. In another example embodiment, the classifier may be a regression classifier. According to an example embodiment, the method may further include optimizing the classifier by determining values of attribute(s) of each of the exemplar images. In another example embodiment, the method may further include optimizing the classifier by determining values of attribute(s) of each of a plurality of generated images. According to an example embodiment, the method may further include optimizing the classifier by processing the exemplar images and the generated images with the classifier to produce (a) classifier estimated values of the attribute(s) of each of the exemplar images and (b) classifier estimated values of the attribute(s) of each of the generated images. In another example embodiment, the method further includes optimizing the classifier by, based on (i) the determined values of the attribute(s) of each of the exemplar images, (ii) the determined values of the attribute(s) of each of the generated images, (iii) the classifier estimated values of the attribute(s) of each of the exemplar images, and (iv) the classifier estimated values of the attribute(s) of each of the generated images, optimizing the classifier to improve accuracy of (a) the classifier estimated values of the attribute(s) of each of the exemplar images and the classifier estimated values of the attribute(s) of each of the generated images, compared to (b) the determined values of the attribute(s) of each of the exemplar images and the determined values of the attribute(s) of each of the generated images.

In an example embodiment, determining the similarity score of the output image by processing the output image based on the similarity objective may include processing the output image with a discriminator to determine an estimated likelihood value for the output image, wherein the estimated likelihood value represents a probability that the output image belongs to a same distribution as the exemplar images. According to another example embodiment, determining the similarity score of the output image by processing the output image based on the similarity objective may further include processing the estimated likelihood value based on the similarity objective to determine adversarial loss for the image generator. In an example embodiment, the determined adversarial loss may be the determined similarity score. According to another example embodiment, the discriminator may be a conditional discriminator. In an example embodiment, the method may further include processing both the output image and the selected input attribute(s) to determine the estimated likelihood value. According to another example embodiment, the estimated likelihood value may further represent a probability that the output image belongs to a distribution of a subset of the exemplar images. In an example embodiment, exemplar images in the subset may have attributes similar to the selected input attribute(s). According to another example embodiment, the method may further include optimizing the discriminator by determining values of attributes(s) of each of the exemplar images. In an example embodiment, the method may further include optimizing the discriminator by processing, with the discriminator, each of the exemplar images paired with the determined values of the attribute(s) of each of the exemplar images to produce a similarity score for each of the exemplar images. According to another example embodiment, the method may further include optimizing the discriminator by processing generated images, where each of the generated images may be paired with input attribute(s) used to produce the generated images, with the discriminator to produce a similarity score for each of the generated images. In an example embodiment, the method may further include optimizing the discriminator by, based on the discriminator produced similarity score for each of the generated images and the discriminator produced similarity score for each of the exemplar images, optimizing the discriminator to reduce the similarity score for each of the generated images and increase the similarity score for each of the exemplar images.

According to an example embodiment, the method may further include optimizing input attributes to the image generator. In another example embodiment, processing the optimized input attributes with the image generator may produce an image with a specified value for target attribute(s). According to an example embodiment, optimizing the input attributes may include producing a given image by processing the target attribute(s), at a given value, with the image generator. In another example embodiment, optimizing the input attributes may further include processing the given image to determine a value of the target attribute(s) for the given image. According to an example embodiment, optimizing the input attributes may further include, based on the determined value of the target attribute(s) for the given image and the specified value for the target attribute(s), determining a fitness score representing similarity of the determined value of the target attribute(s) to the specified value. In another example embodiment, optimizing the input attributes may further include, based on (i) the determined value of the target attribute(s), (ii) the specified value for the target attribute(s), and (iii) the determined fitness score, determining a new value of the target attribute(s). According to an example embodiment, the new value may improve the fitness score. In another example embodiment, optimizing the input attributes may further include iterating the producing the given image, processing the given image, determining the fitness score, and determining the new value until the image with the specified value for the target attribute(s) is produced.

Another embodiment is directed to a system for generating images. The system includes a processor and a memory with computer code instructions stored thereon, where the processor and the memory, with the computer code instructions, are configured to cause the system to provide an image generator and an image generator optimizer. The image generator is configured to produce an output image based on an input attribute. The image generator optimizer is configured to optimize the image generator to produce images that are qualitatively similar to exemplar images. Attributes of the produced images are quantitatively similar to user input attributes. According to an embodiment, the user input attributes are outside of exact values and interpolated ranges of values of attributes of the exemplar images.

In an example embodiment, "quantitative similarity" may include similarity of controlled attributes(s), i.e., the attributes represented in at least one of input attributes, exemplar attributes, and target attributes (the latter, e.g., size of particles, for non-limiting example). According to another example embodiment, an image may be quantitatively similar with respect to particular attributes if the attributes of the image are numerically close to the particular attributes. In an example embodiment, two images may be quantitatively similar to each other if attributes of both images are numerically close.

According to an example embodiment, "qualitative similarity" may include similarity of attributes, e.g., particle shape, for non-limiting example, that are not controlled attribute(s). In another example embodiment, an image may be qualitatively similar to another image if the two images appear similar after accounting for differences in their controlled attribute(s). In another example embodiment, two images can be quantitatively similar, but not qualitatively similar For instance, according to an example embodiment, an image with spherical particles and an image with cubic particles can have the same particle size distribution (quantitatively similarity), but the two images are not qualitatively similar, i.e., because the particle shapes (spherical and cubic) are different. In another example embodiment, two images can be qualitatively similar, but not quantitative similar. For instance, according to an example embodiment, one image can have spherical particles with average size of 10 μm, while another image can have spherical particles with average size of 5 μm; the two images are not quantitatively similar because of the different average particle sizes (but they are qualitative similar, as both have spherical particles).

In another example embodiment, qualitative similarity scores may be determined using, e.g., deep learning and/or neural network(s). According to an example embodiment, a similarity score, may reflect a combination or permutation of neural network(s) coefficients, which may number in, e.g., thousands. In another example embodiment, a real-world instance is that if a dog and a cat have the same, e.g., size, eye pointiness, fur color and/or pattern, then they are quantitatively, but not qualitatively, similar, for non-limiting example. According to an example embodiment, a deep learning model for instance can recognize a lack—or presence—of qualitative similarity by learning or training from prior knowledge of cat and dog images, for non-limiting example.

In an example embodiment, qualitative and/or quantitative similarity may be relative to features of interest, controls of the features of interest in an application, and/or a corresponding image generator optimization strategy.

According to an example embodiment, quantitative similarity may be based on particle size, for non-limiting example, and the qualitative similarity may be based on particle shape, for non-limiting example, such that an image generator, when optimized for exemplar images including a mix of spherical and cubic particles, may produce images with a specified particle size but the same mix of spherical and cubic particles as in the exemplar images.

In another example embodiment, the quantitative similarity may be based on particle shape, for non-limiting example, and the qualitative similarity may be based on particle size, for non-limiting example, such that the image generator, when trained on the same exemplar images including a mix of spherical and cubic particles, may produce images with all spherical particles, all cubic particles, or an arbitrary mix of spherical and cubic particles, but at the same particle size as in the exemplar images.

In another example embodiment, attributes of the output image may be both qualitatively similar to the exemplar images and quantitatively similar to the input attribute.

According to another example embodiment, the image generator may be further configured to generate a single image with smoothly varying attributes based on at least one of fixed tiling or adaptive tiling. In an example embodiment, an image with "smoothly varying attributes" may include an image with no visible discontinuity/incongruence in the image itself. According to another example embodiment, a tiled image may have visible discontinuity/incongruence where features in one tile clearly do not align with features in an adjacent tile, for non-limiting example.

In an example embodiment, equivariant modulation, e.g., multi-scale equivariant feature modulation, described in more detail herein, and/or similar approaches, for non-limiting examples, may also be used to generate images with smoothly varying attributes. According to another example embodiment, for instance, when a data size is large, a conventional algorithm may need to process a portion of the data at a time, thus creating tiling artifacts, for non-limiting example. In an example embodiment, equivariant modulation, e.g., multi-scale equivariant feature modulation, and/or similar approaches, for non-limiting examples, may be used to address this problem of tiling artifacts, resulting in images with smoothly varying attributes; in addition, such images may be more realistic as compared to images generated using traditional approaches.

In an example embodiment, the image generator may be configured to generate output image(s) larger than image(s) of the exemplar images and/or the image generator may be configured to generate output image(s) with higher dimensionality than image(s) of the exemplar images.

According to another example embodiment, an image of the exemplar images may be a camera generated image, an image of the exemplar images may be a computer-generated image based on a sketch, a textural description, a synthetically created object, or a real-world object, or an image of the exemplar images may be based on observations of a physical structure.

In an example embodiment, attributes of the produced images may include volume fraction (e.g., porosity), size distribution, shape distribution, connectivity, tortuosity, porosimetry, conductivity, elasticity, diffusivity, autocorrelation, or coordination number, among other examples.

According to another example embodiment, the processor and the memory, with the computer code instructions, may be further configured to cause the system to evaluate the attributes of the produced images using image processing. In an example embodiment, the image processing may include at least one of: watershed segmentation, label statistics quantification, network graph search, distance transform, and Fourier transform, for non-limiting examples.

In an example embodiment, the image generator may be a convolutional neural network including convolution layer(s), where each convolution layer includes input channel(s) and output channel(s). According to another example embodiment, the input attribute may cause the convolutional neural network to produce a weight and bias value for each of the output channel(s) of each of the convolution layer(s). In an example embodiment, based on each weight and bias value, a transformation may be applied to each output of each convolution layer.

Yet another embodiment is directed to a system for generating images. The system includes a processor and a memory with computer code instructions stored thereon, where the processor and the memory, with the computer code instructions, are configured to cause the system to provide (i) an image generator implemented with a first neural network, (ii) a discriminator implemented with a second neural network, and (iii) a regression classifier implemented with a third neural network. The image generator is configured to receive input attributes and produce an output image. The output image has attributes that approximate the input attributes. The discriminator is configured to produce a similarity score based on an input including an image and attributes. The similarity score represents a likelihood that the image and the attributes are a sample from an exemplar distribution. The regression classifier is configured to produce an estimate of attributes of an input image. Moreover, in the system, alternating iterative optimization of the image generator, discriminator, and regression classifier configures the image generator to output images that are quantitatively similar to images from the exemplar distribution and with attributes quantitatively similar to input attribute(s). In an example embodiment, the image and the attributes may be a generated image and corresponding input attributes or an example image and determined attributes. According to another example embodiment, the input image may include generated image(s) or exemplar image(s).

Another embodiment is directed to a method and a system for generating structure images, i.e., synthetic images, with specified attributes not limited to those within some exemplar attribute distribution. In this example embodiment, an image generator is simultaneously optimized for two objectives: a similarity objective, which scores qualitative similarity of the generated images to the exemplar images, and an attribute objective, which scores quantitative similarity of the specified generated attributes to the input attributes.

An iterative optimization process is employed in an embodiment. The iterative optimization process comprises sampling input attributes from some distribution, the distribution potentially differing from the exemplar attribute distribution, producing generated images by applying the image generator to those attributes, evaluating the generated images according to the two optimization objectives, and modifying the image generator such that its performance according to the optimization objectives is higher on a next iteration. Such an optimization process can iterate until some termination condition is met or terminated manually.

Note that since it is generally infeasible to manually provide attributes for each structure image, some embodiments use attribute evaluators to automate the determination of attributes from structure images. According to an embodiment, a given exemplar image of the plurality of exemplar images is a camera generated image and a given synthetic image is a computer-generated image. In an embodiment, at least one image, e.g., of exemplar images and/or generated, i.e., synthetic images, is an image of at least: two materials dispersed into each other, a porous material, a pharmaceutical product, and a battery electrode. Example attributes, according to an embodiment, comprise at least one of: volume fraction, particle size distribution, particle shape, porosity, connectivity, tortuosity, porosimetry, conductivity, elasticity, diffusivity, autocorrelation, and coordination number. In some embodiments, attribute evaluators include at least one of: watershed segmentation, label statistics quantification, network graph search, distance transform, and Fourier transform.

In many optimization techniques, especially the gradient optimization techniques used by deep-learning methods, it is necessary for the optimization objectives to be end-to-end differentiable. Many attribute evaluators are not differentiable in this way, so optimizing for those attributes requires a differentiable approximation. In an embodiment, the differentiable approximation is implemented as a classifier that, given a structure image as input, outputs an estimate of attributes of that structure image. The classifier, itself a deep-learning model, may also be optimized. While it is possible to optimize a general-purpose classifier ahead-of-time, such general-purpose classifiers exhibit lower accuracy and, in embodiments, can promote the learning of unrealistic features. However, a specialized classifier optimized for only the plurality of exemplar images would not fulfill the extrapolative requirements of the attribute objective.

Another embodiment is directed to a method of optimizing an image classifier. According to an embodiment, the classifier is a regression classifier. The method determines values of one or more attributes of each of a plurality of exemplar images and, likewise, determines values of the one or more attributes of each of a plurality of generated images, i.e., synthetic images, fake images. The plurality of exemplar images and the plurality of generated images are processed with a neural network implemented classifier to determine: (a) classifier estimated values of the one or more attributes of each of the plurality of exemplar images and (b) classifier estimated values of the one or more attributes of each of the plurality of generated images. In turn, the classifier is optimized to output values of the one or more attributes of an input image based on: (i) the determined values of the one or more attributes of each of the plurality of exemplar images, (ii) the determined values of the one or more attributes of each of the plurality of generated images, (iii) the classifier estimated values of the one or more attributes of each of the plurality of exemplar images, and (iv) the classifier estimated values of the one or more attributes of each of the plurality of generated images.

According to an embodiment, the optimization includes computing a classification loss. In such an embodiment, the classification loss is the difference between the determined values of the one or more attributes of each of the plurality of generated images and the classifier estimated values of the one or more attributes of each of the plurality of generated images, plus the difference between the determined values of the one or more attributes of each of the plurality of exemplar images and the classifier estimated values of the one or more attributes of each of the plurality of exemplar images. In an embodiment, optimizing the classifier includes adjusting the parameters of the neural network implementing the classifier to lower the computed classification loss.

In embodiments, a similarity objective can be implemented in a wide variety of ways. One such embodiment is a perceptual loss, where exemplar and generated images are encoded into a common representation that facilitates qualitative comparisons, and the objective is to minimize the distance between each generated image's representation and the nearest exemplar image's representation. Another embodiment implements the similarity objective as a style loss, as used in the original STS method. A third embodiment implements an adversarial loss with a discriminator model, where the discriminator model is optimized in an interleaved fashion with the image generator.

According to an embodiment using a discriminator-based adversarial loss as the similarity objective, it is not necessary in theory for the discriminator to be conditional on the exemplar or input attributes, i.e., the discriminator can be configured to receive only the exemplar and generated images as input. However, experimental results with an embodiment showed improved quality and extrapolation when using a conditional discriminator. In this configuration, the similarity objective also serves as an attribute objective for input attributes that are within the exemplar attribute distribution.

In some embodiments, the image generator by itself provides precise control, i.e., arbitrarily small variations of the attributes can be generated, but the accuracy of those variations tends to be insufficient. For example, if a user provides "porosity=20%" as an input attribute, the porosity of the generated image may be 25% instead. The user can manually correct this inaccuracy by trying a variety of input attributes until the output attributes equal the original target attributes, however such manual correction is tedious or intractable for multiple attributes.

To resolve that issue, an embodiment further provides a method and system of automatically optimizing the input attributes such that the corresponding generated attributes are equal to a user's target attributes within an arbitrary tolerance. Such an embodiment can also report to the user if the target attributes are invalid, either because they are nonsensical or because the image generator cannot output those attributes for any input attributes. Embodiments may use an iterative process of sampling input attributes, generating an image for the sampled input attributes, evaluating the attributes of the image, comparing the evaluated attributes to a user's target attributes, and adjusting how the next input attributes are sampled. The result of the iterative process is the input attributes which generate an image with attributes closest to the user's target attributes.

Note that in some embodiments, the input and target attributes do not need to be of the same type, e.g., the input attribute can be porosity (a property attribute), but the target attribute can be permeability (a performance attribute), if an evaluator for permeability is provided. Such embodiments are the most efficient for structure engineering purposes to save a user's time, as the user need only specify the required output performance attributes without knowing the performance of the exemplar image. Once the optimal performance attributes are found, the user can check the generated property attributes for those input attributes, e.g., the actual porosity of the generated image for the optimal input porosity, and report that value as the answer to the structure engineering problem to inform product design (e.g., reduce or increase porosity in the product formulation).

Yet another embodiment is directed to a system for generating images. The system includes a processor and a memory with computer code instructions stored thereon, where the processor and the memory, with the computer code instructions, are configured to cause the system to provide (i) a generator implemented with a first neural network, (ii) a discriminator implemented with a second neural network, and (iii) a regression classifier implemented with a third neural network. In such an embodiment, the generator is trained to receive random noise and random or user-controlled input attributes and produce an output image, where the produced output image has attributes that approximate the input attributes. The discriminator is trained to receive an input that includes a generated image and input attributes, or an exemplar image and evaluator-determined attributes. Further, the discriminator is trained to output a score for the input, where the score represents the likelihood that the input is a sample from the exemplar distribution. In such an embodiment, the regression classifier is trained to receive a given generated image or given exemplar image and output an approximation of the attributes of the given generated image or given exemplar image. Moreover, in the system, alternative iterative operation of the generator, discriminator, and classifier during a training period causes the system to produce an image generator that outputs images that are qualitatively similar to the plurality of exemplar images and with attributes quantitatively similar to the input attributes.

In an embodiment, the generator is a convolutional neural network consisting of at least one convolution layer, each consisting of at least one channel. In another embodiment, the generator is further configured to produce from the input attributes a weight and bias for each channel of each convolution layer, the weight and bias used to apply a transformation to each output of the convolution layer.

In another embodiment the generator is further configured to generate a single image with smoothly varying attributes, using one of (i) fixed tiling, (ii) adaptive tiling, and (iii) equivariant modulation. According to an embodiment, equivariant modulation uses different weights and biases for each feature value based on what the attributes should occur at that location. In another embodiment, the generator is configured to generate a larger image from one or more existing, smaller images. Further still, in an example embodiment, the generator is configured to generate a higher dimension image from one or more existing, lower dimension images. In yet another embodiment, the attributes of the synthetic image produced by the generator correspond to, i.e., honor, at least one of: attributes of images in the exemplar image distribution and a variation of one or more of the attributes of the images in the exemplar image distribution.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.
Example Optimization Phase

Figure 1:
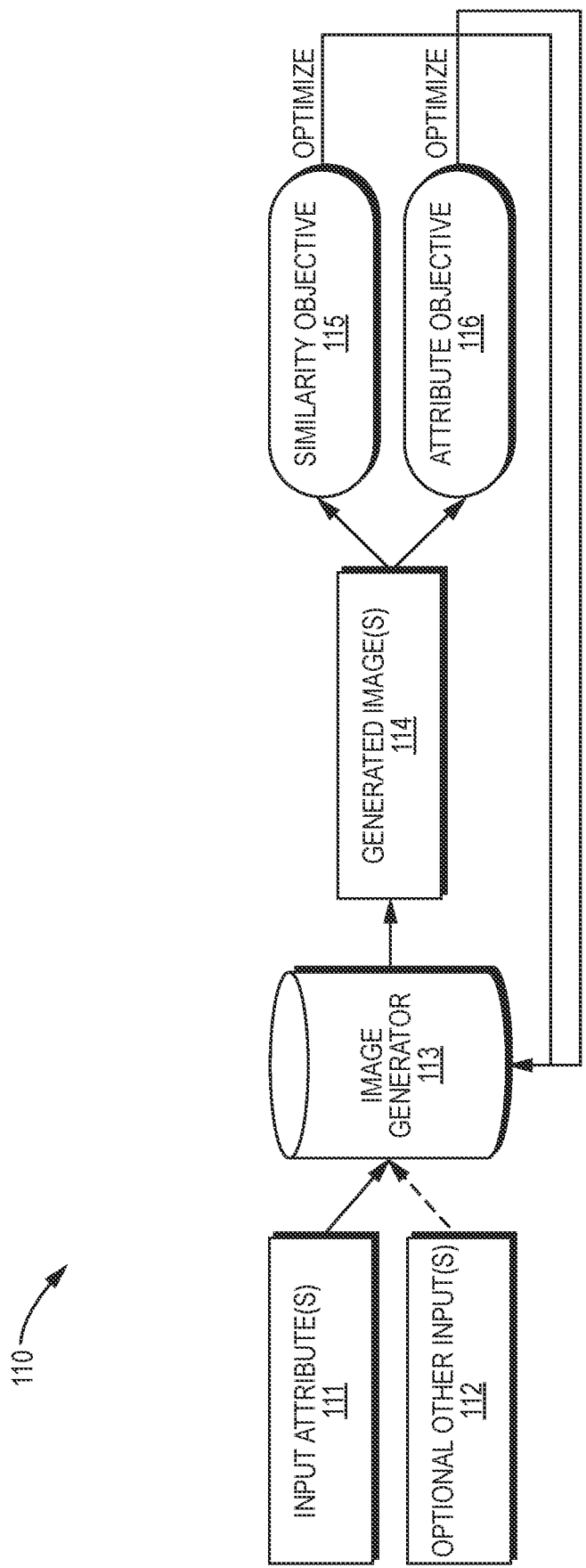
FIG. 1 is a block diagram illustrating a procedure for optimizing an image generator according to an example embodiment.

FIG. 1 is a block diagram illustrating a procedure 110 for optimizing an image generator 113 according to an example embodiment. In an example embodiment, the generator 113 may be a neural network that, when given one or more selected input attribute(s) 111, optionally along with one or more other input(s) 112, e.g., random noise, produces generated image(s) 114 that are visually similar to exemplar images (not shown) used during optimization of the image generator 113 and that have attributes approximately equal to the input attribute(s) 111. According to another example embodiment, selection of the input attribute(s) 111 may be random, e.g., random sampling. Further, in yet another example embodiment, the image generator 113 may be a structure image generator and the procedure 110 may include optimizing the structure image generator 113 to extrapolate from a distribution of the exemplar images.

In an example embodiment, the input attribute(s) 111 may take on values that lie outside a distribution of attributes of the exemplar images, i.e., the input attribute(s) 111 are not limited to values exactly represented in the distribution of attributes of the exemplar images, and are not limited to values that are an interpolation of values exactly represented in the distribution of attributes of the exemplar images.

According to an example embodiment, visual similarity to the plurality of exemplar images may be optimized by a similarity objective 115, which, given the generated image(s) 114, may inform how to update the image generator 113 to improve the similarity objective 115 and, thus, the visual similarity. In other words, the similarity objective 115 is used to determine how similar the generated image(s) 114 are to the exemplar images and, based on the determined similarity, modifications may be made to the image generator 113 so that in a future iteration, the generated image(s) 114 are more similar to the exemplar images. In another example embodiment, closeness of the attributes of the generated image(s) 114 to the input attributes(s) 111 may be optimized by an attribute objective 116, which, given the generated image(s) 114, may inform how to update the image generator 113 to improve the attribute objective 116 and, thus, the accuracy of the generated image(s) 114 for the input attribute(s) 111.

In an example embodiment, repetitive or iterative application of the procedure 110 may cause the image generator 113 to approach and reach a state called convergence where no further improvement can be achieved, i.e., the image generator 113 generates images with a highest similarity and closeness possible for the input attribute(s) 111.

Figure 2:
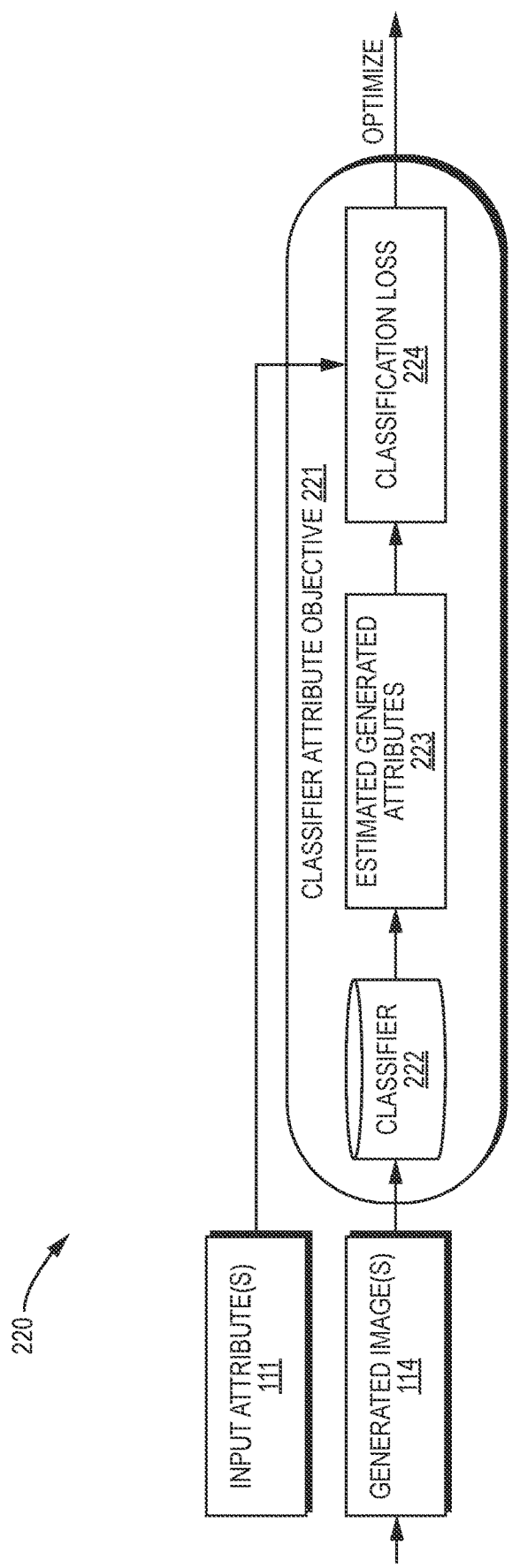
FIG. 2 is a block diagram illustrating a procedure for implementing an attribute objective with a classifier according to an example embodiment.

FIG. 2 is a block diagram illustrating a procedure 220 for implementing the attribute objective 116 of FIG. 1 as a classifier attribute objective 221 according to an example embodiment. In an example embodiment, as shown in FIG. 2, application of a classifier 222 to the generated image(s) 114 (FIG. 1) may produce estimated generated attributes 223, i.e., the classifier 222 may produce estimates of attributes of the generated image(s) 114. According to another example embodiment, subsequent application of a classification loss 224 to the estimated generated attributes 223 against the input attribute(s) 111 may produce as output the attribute objective 116 as part of the procedure 110 (FIG. 1).

In an example embodiment, the classifier 222 may be a regression classifier. According to another example embodiment, the classifier 222 may be configured to estimate attributes represented by a continuum of real, i.e., decimal, numbers.

Figure 3:
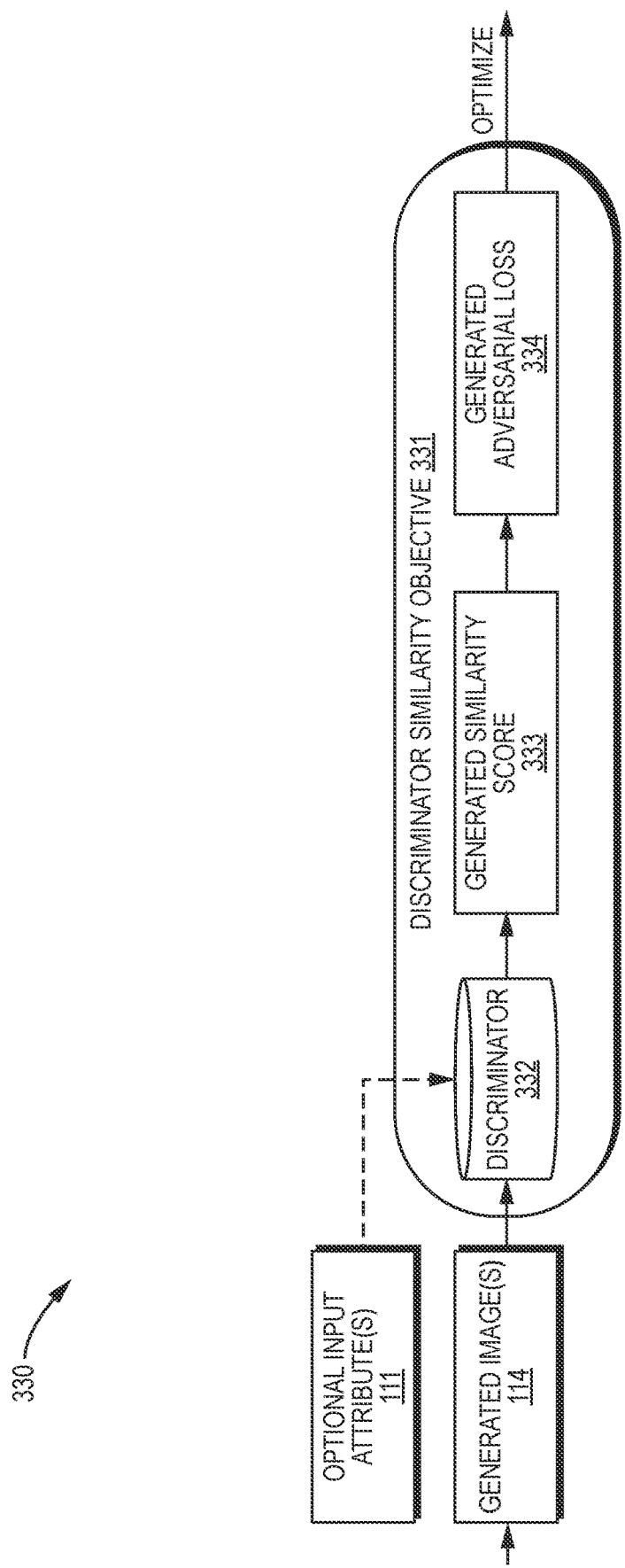
FIG. 3 is a block diagram illustrating a procedure for implementing a similarity objective with a discriminator according to an example embodiment.

FIG. 3 is a block diagram illustrating a procedure 330 for implementing the similarity objective 115 of FIG. 1 as a discriminator similarity objective 331 according to an example embodiment. In an example embodiment, as shown in FIG. 3, a discriminator 332 may take as input the generated image(s) 114 (FIG. 1) and, optionally, the optional input attribute(s) 111 (FIG. 1). The input image(s) 114 (and the optional attribute(s) 111) are processed by the discriminator 332 to determine a generated similarity score 333, i.e., the discriminator 332 may generate an estimated likelihood value for the generated image(s) 114 where the estimated likelihood value represents a probability that the generated image(s) 114 belong to the same distribution as the plurality of exemplar images. According to another example embodiment, subsequent application of a generated adversarial loss 334 to the generated similarity score 333 may produce as output the similarity objective 115 as part of the procedure 110 (FIG. 1). Further, according to an example embodiment, the estimated likelihood value may be high when the generated image(s) are indistinguishable from the plurality of exemplar images, and the estimated likelihood value may be low when the generated image(s) are unlike the exemplar images.

In an example embodiment, the discriminator 332 may be a conditional discriminator. According to another example embodiment, the discriminator 332 may, optionally, further receive the input attribute(s) 111 (FIG. 1) along with the generated image(s) 114. In an example embodiment, the generated similarity score 333 may further represent a probability that the generated image(s) 114 belong to a distribution 666 of exemplar image/attribute(s) pairs (described in more detail hereinbelow in relation to FIG. 6), i.e., a probability that the generated image(s) 114 are similar to a subset of the exemplar images and have attributes similar to the optional input attribute(s) 111.

Figure 4:
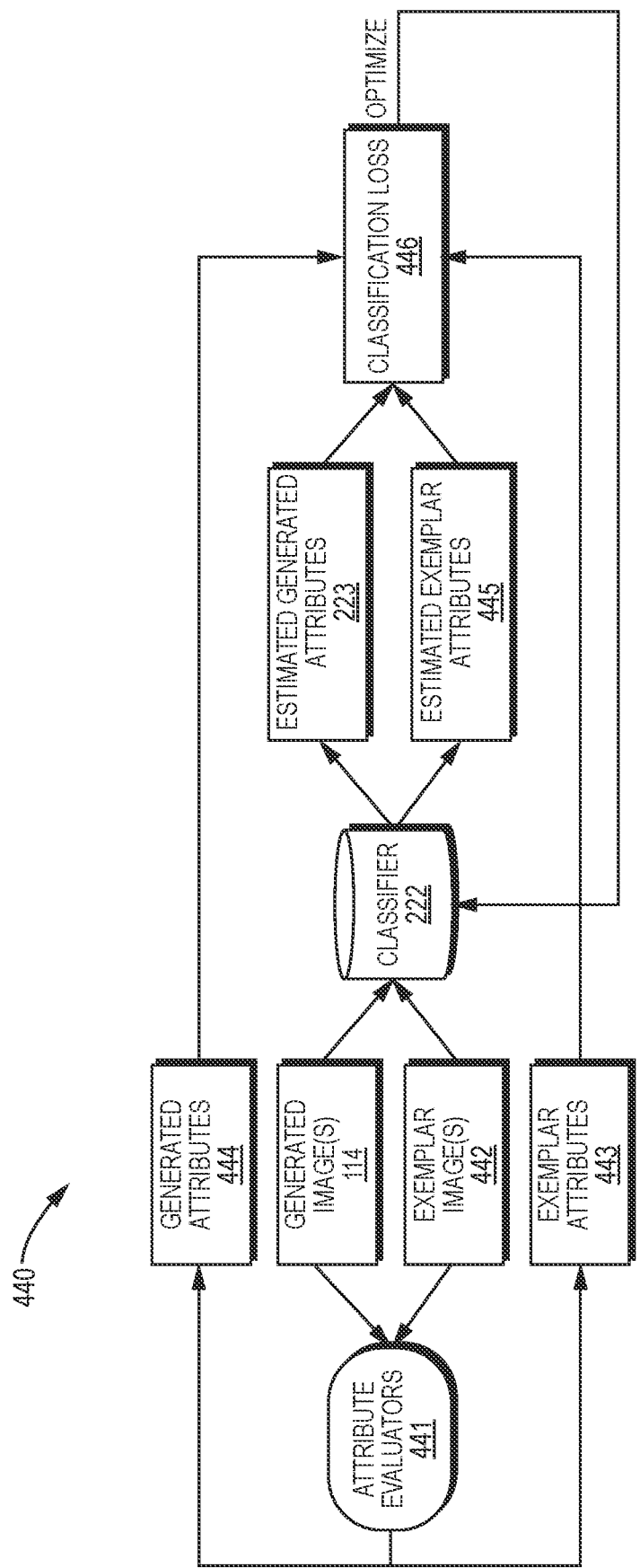
FIG. 4 is a block diagram illustrating a procedure for optimizing a classifier to estimate attributes of exemplar and generated images using attribute evaluators according to an example embodiment.

FIG. 4 is a block diagram illustrating a procedure 440 for optimizing the classifier 222 of FIG. 2 to estimate attributes of both any given exemplar image(s) 442 and the generated image(s) 114 (FIG. 1) according to an example embodiment. In an example embodiment, the procedure 440 may include a supervised classification process, which may require exact or approximate values of exemplar attributes 443 and generated attributes 444 to be known for optimization. According to another example embodiment, attribute evaluators 441 may provide the exemplar attributes 443 and the generated attributes 444 for use in optimization. In an example embodiment, the exemplar image(s) 442 and the generated image(s) 114 may be processed with the classifier 222 to produce (i) the estimated generated attributes 223 (FIG. 2) for the generated image(s) 114 and (ii) estimated exemplar attributes 445 for the exemplar image(s) 442. According to another example embodiment, the estimated generated attributes 223, the generated attributes 444, the estimated exemplar attributes 445, and the exemplar attributes 443 may be processed using a classification loss 446 to inform how to update the classifier 222 such that in subsequent applications of the procedure 440, a difference between the estimated exemplar attributes 445 and the exemplar attributes 443 is reduced, and in subsequent applications of the procedure 220 (FIG. 2) or the procedure 440, a difference between the estimated generated attributes 223 and the generated attributes 444 is reduced. Further, in yet another example embodiment, the exemplar image(s) 442 may be exemplar structure images, the generated image(s) 114 may be extrapolated structure images, and the procedure 440 may include optimizing the classifier 222 for the exemplar and extrapolated structure images using the attribute evaluators 441.

Figure 5:
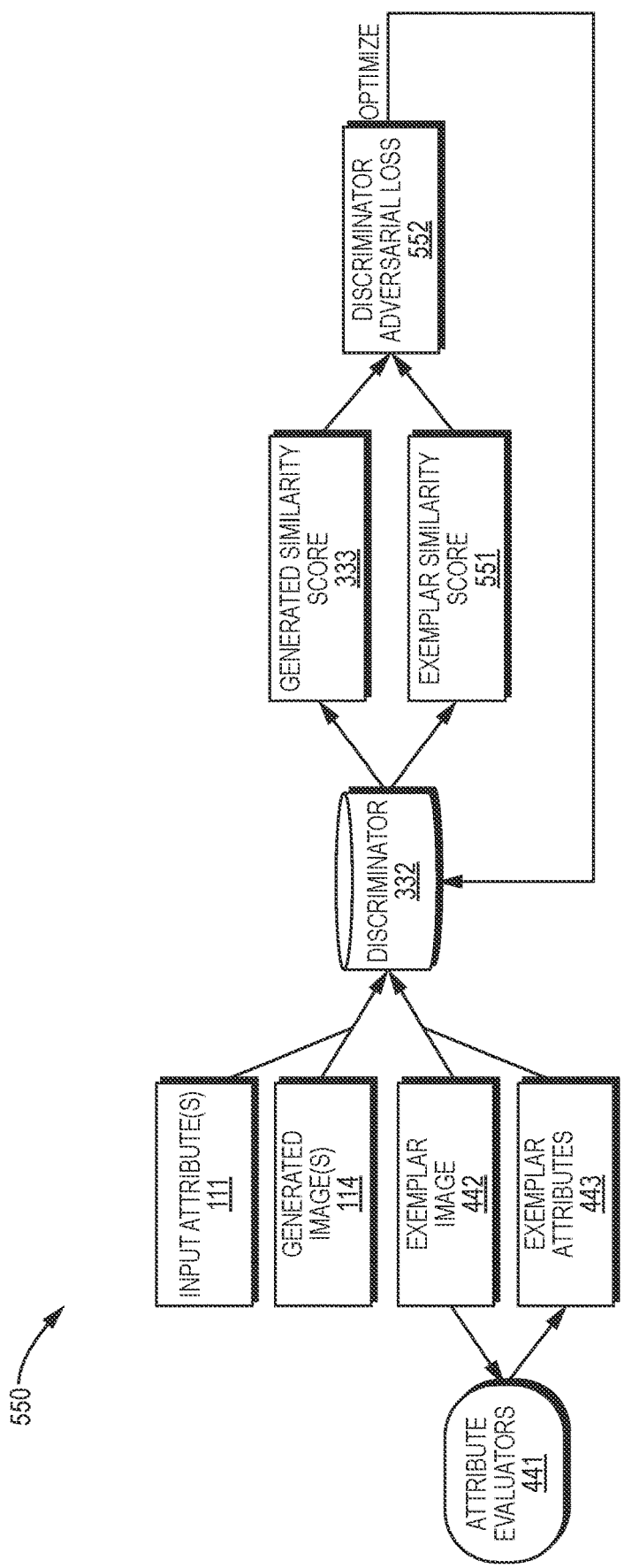
FIG. 5 is a block diagram illustrating a procedure for optimizing a discriminator to estimate a probability that exemplar and generated images belong to an exemplar distribution according to an example embodiment.

FIG. 5 is a block diagram illustrating a procedure 550 for optimizing the discriminator 332 of FIG. 3, which may be a conditional discriminator, to estimate a probability that a given input belongs to an exemplar distribution according to an example embodiment. In an example embodiment, the given input may include an image paired with its attributes. Unlike in the procedure 440 (FIG. 4), in another example embodiment, as shown in FIG. 5, the associated attributes of the generated image(s) 114 (FIG. 1) may be the input attribute(s) 111 (FIG. 1) used in the procedure 110 (FIG. 1) to produce the generated image(s) 114. According to an example embodiment, this may allow the discriminator 332 to learn to reject the generated image(s) 114 when the generated image(s) 114 are in conflict, i.e., inaccurate, for the given input attribute(s) 111. In another example embodiment, the exemplar attributes 443 (FIG. 4) may still be provided by the attribute evaluators 441 (FIG. 4) as in the procedure 440. According to an example embodiment, applying the discriminator 332 to the generated image(s) 114 paired with the input attribute(s) 111 may produce the generated similarity score 333 (FIG. 3) and applying the discriminator 332 to the exemplar image 442 (FIG. 4) paired with the exemplar attributes 443 may produce exemplar similarity score 551. In another example embodiment, subsequently applying discriminator adversarial loss 552 to the generated similarity score 333 and the exemplar similarity score 551 may inform how to update the discriminator 332 such that in subsequent applications of the procedure 550, the exemplar similarity score 551 may be higher, and in subsequent applications of the procedure 330 (FIG. 3) or the procedure 550, the generated similarity score 333 may be lower.

As described hereinabove, an example embodiment may train the image generator 113 (FIG. 1), the classifier 222 (FIG. 2), and/or the discriminator 332 (FIG. 3) using, variously, the procedures 110 (FIG. 1), 220 (FIG. 2), 330 (FIG. 3), 440 (FIG. 4), and/or 550 (FIG. 5). According to an example embodiment, a training process may include executing the procedures 110, 220, and 330 together, followed by executing the procedures 440 and 550 together. In another example embodiment, this series of procedure execution (a process including executing the procedures 110, 220, and 330 together followed by executing the procedures 440 and 550 together) may repeat until a termination threshold is met. According to an example embodiment, the termination threshold may include a time limit, a preset number of iterations (i.e., steps), desired value(s) of the attribute objective 116 (FIG. 1), or desired value(s) of the similarity objective 115 (FIG. 1). Further, in yet another example embodiment, additionally or alternatively, repetition may occur until terminated by a user after examining an output image in comparison with an exemplar image, attributes of the output image and the exemplar image, and/or value(s) of the similarity objective 115 and/or attribute objective 116.

Figure 6:
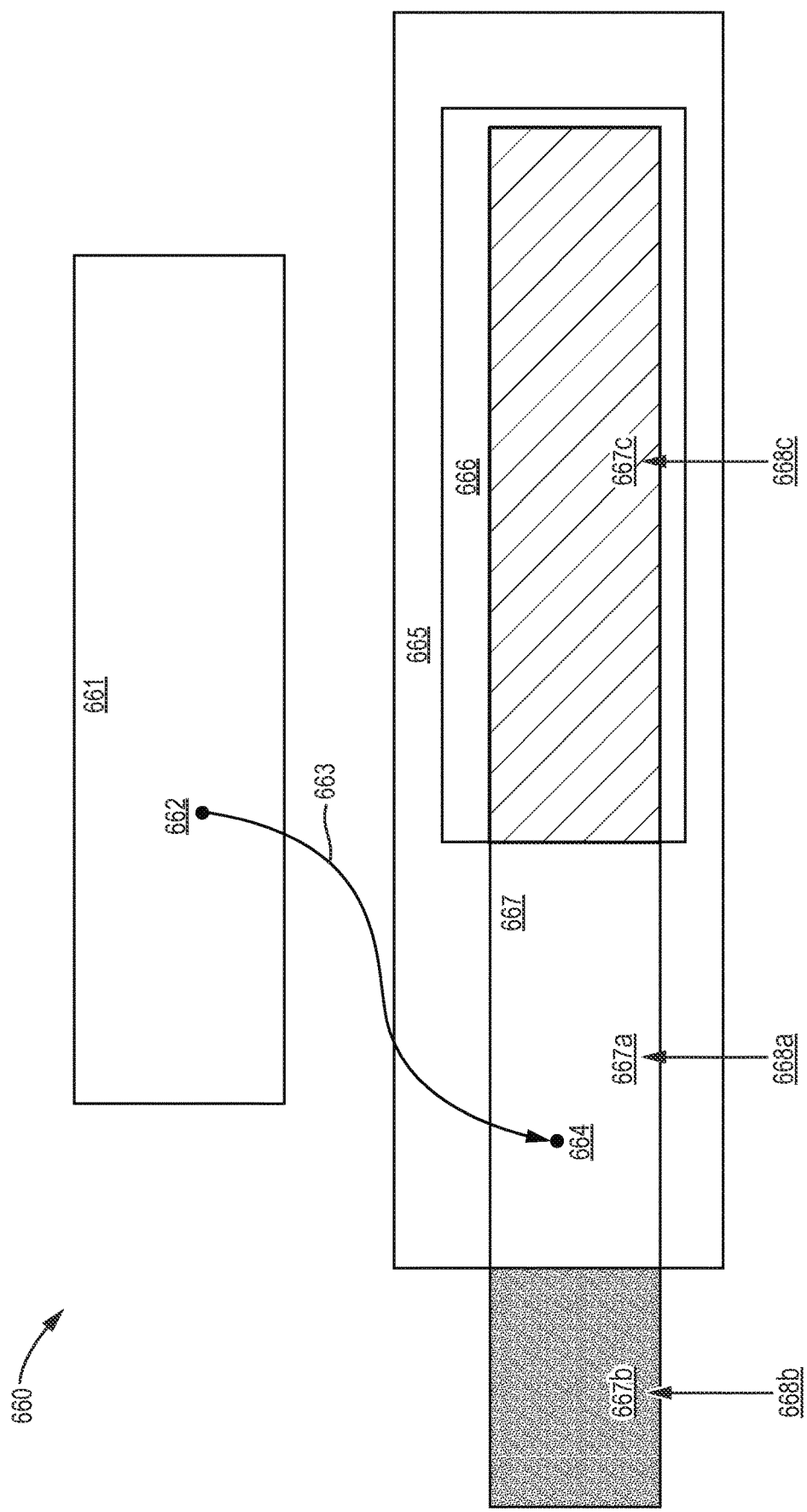
FIG. 6 is a block diagram illustrating an example problem of learning to extrapolate from exemplars according to an example embodiment.

FIG. 6 is a block diagram illustrating an example problem 660 of learning to extrapolate from exemplars according to an example embodiment. In an example embodiment, the problem 660 may include generating samples from a complex distribution of image/attribute(s) pairs, where, for a given image/attribute pair of the generated samples, actual attributes of the image are approximately equal to the sampled attributes in the pair, but where the generated samples are not strictly limited to the distribution of exemplar image/attribute(s) pairs. According to another example embodiment, a distribution 661 of all possible attribute values paired with latent, i.e., random, additional input may be used to generate individual input samples 662 according to a well-defined procedure, e.g., traditional pseudo-random number generation algorithms or other suitable known algorithms. In an example embodiment, the input samples 662 may be mapped to individual generated samples 664 by a function 663 which, given an input sample 662, may produce a generated sample 664. According to another example embodiment, a given individual sample of the input samples 662 may have attributes of (Noise, Porosity=40%), for non-limiting example Similarly, in an example embodiment, a given individual image of the generated samples 664 may have attributes of (Image, Porosity=40%), for non-limiting example.

According to an example embodiment, the function 663 may be defined to be a result of applying the image generator 113 (FIG. 1) to the input sample 662, and passing through attributes of the input sample 662 without modification. In another example embodiment, the function 663 may thus define a distribution 667 of generated samples, i.e., the generated samples 664 where, for a given generated sample 664, an input sample 662 within the input distribution 661 exists such that applying the function 663 to the input sample 662 produces the given generated sample 664. Further, in yet another example embodiment, the function 663 may be specified as follows, for non-limiting example:

$$f(x,y)=(\text{GENERATOR}(x,y),y)$$

In an example embodiment, an objective may be for the distribution 667 of generated samples to extend as far beyond a distribution 666 of exemplar samples as possible, without extending beyond a distribution 665 of correct samples. According to another example embodiment, the objective may partition the distribution 667 of generated samples into three subsets 667a-c. In an example embodiment, 667a may be a portion of the distribution 667 of generated samples that are correct, i.e., within the distribution 665 of correct samples, and extrapolative, i.e., outside the distribution 666 of exemplar samples. According to another example embodiment, 667b may be a portion of the distribution 667 of generated samples that are incorrect, i.e., outside the distribution of correct samples 665. Further, in yet another example embodiment, 667c may be a portion of the distribution 667 of generated samples that are not extrapolative, i.e., within the distribution 666 of exemplar samples.

According to an example embodiment, the objective may include three sub-goals 668a-c. In another example embodiment, 668a may be a sub-goal of increasing a size of the portion 667a of the distribution 667 of generated samples that are correct and extrapolative, i.e., simply increasing a capability of function 663 to extrapolate beyond the distribution 666 of exemplar samples. According to an example embodiment, 668b may be a sub-goal of reducing a size of the portion 667b of the distribution 667 of generated samples that are not correct, i.e., reducing a frequency and magnitude of errors in the generated samples 664 produced by the function 663. Further, in yet another example embodiment, 668c may be a sub-goal of increasing a size of the portion 667c of the distribution 667 of generated samples that intersects the distribution 666 of exemplar samples, i.e., improving a similarity of the generated samples 664 to the exemplar samples and ensuring that the function 663 at least covers an entirety of the distribution 666 of exemplar samples, i.e., no exemplar samples are "forgotten."

Note that in some embodiments, implementation of the similarity objective 115 (FIG. 1) for the sub-goal 668c may conflict with the sub-goal 668a, i.e., optimizing the function 663 according to the sub-goal 668c too strongly may cancel out optimization of the function 663 according to the sub-goal 668a. In an example embodiment, such a conflict may be a primary justification for the existence of the attribute objective 116 (FIG. 1), as optimizing for the similarity objective 115 alone may collapse the distribution 667 of generated samples down to being equal to the distribution 666 of exemplar samples, i.e., the portion 667a of the distribution 665 of correct, extrapolative generated samples may be empty, i.e., the function 663 may have no capability to extrapolate.

Example Inference Phase

After training, an embodiment may discard the classifier 222 (FIG. 2) and the discriminator 332 (FIG. 3), because the classifier 222 and the discriminator 332 may not be required for generating images with the image generator 113 (FIG. 1). In an example embodiment, the image generator 113 may generate large volumes, i.e., images, in tiles so as to use fewer hardware resources. According to another example embodiment, in such a scheme, the input attributes 114 (FIG. 1) can differ independently for each tile. Further, in yet another example embodiment, as long as a tile size is small relative to a rate of attribute change across tiles, the generated image(s) 114 (FIG. 1), which may include multiple tiles, may contain minimal tiling artifacts.

Figure 7:
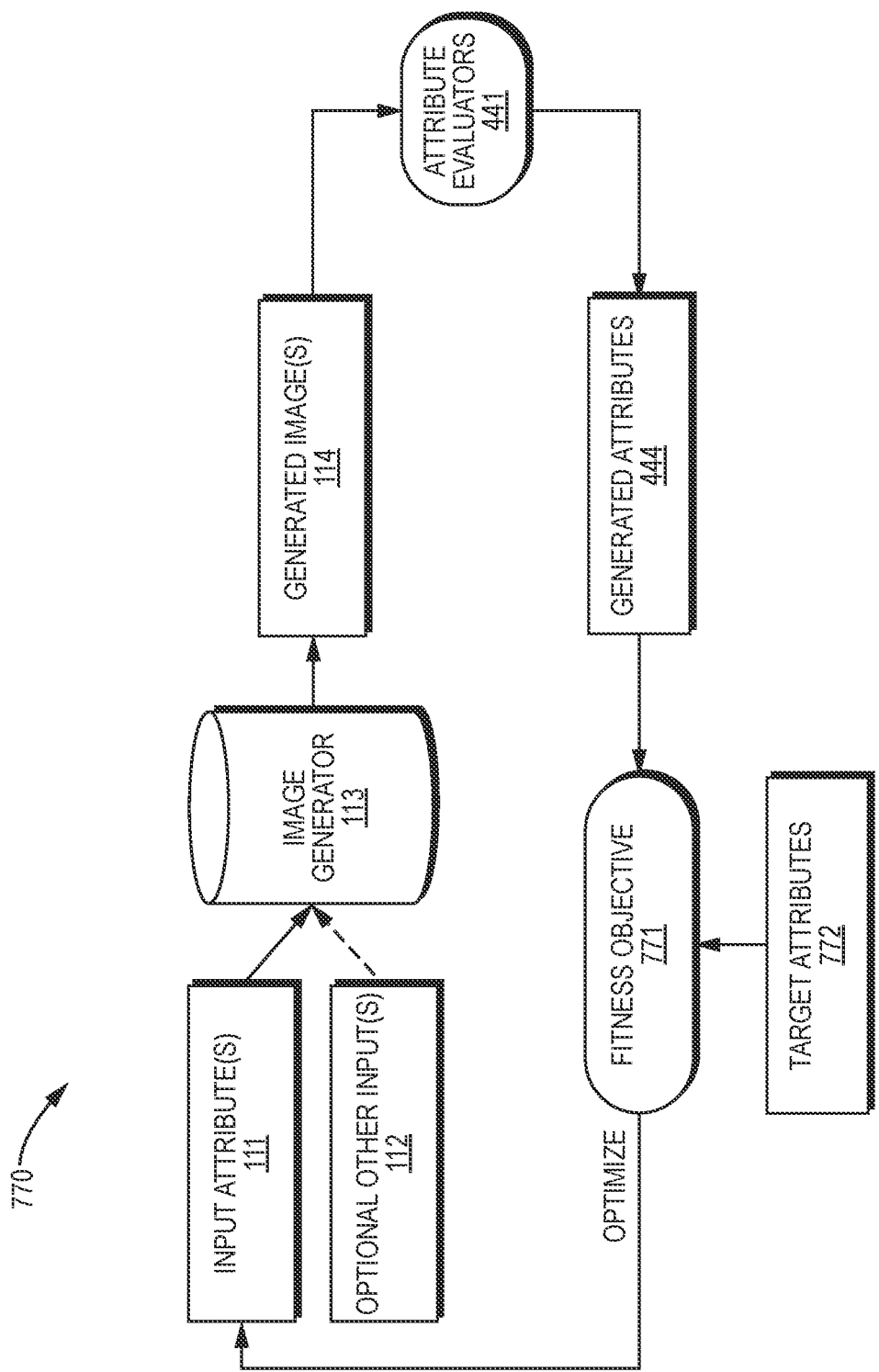
FIG. 7 is a block diagram illustrating a procedure for updating at least one input attribute to achieve at least one target attribute according to an example embodiment.

FIG. 7 is a block diagram illustrating a procedure 770 to produce the generated image(s) 114 (FIG. 1) with the generated attributes 444 (FIG. 4) equal to specified target attributes 772 as determined by the attribute evaluator(s) 441 (FIG. 4), using optimization of a fitness objective 771 according to an example embodiment. In an example embodiment, the procedure 770 may include a repetition of four operations: (i) applying the image generator 113 (FIG. 1) to the input attribute(s) 111 (FIG. 1) to produce the generated image(s) 114, (ii) applying the attribute evaluator(s) 441 to the generated image(s) 114 to produce the generated attributes 444, (iii) applying the fitness objective 771 to the generated attributes 444 against the specified target attributes 772, and (iv) proposing new values for the input attribute(s) 111 expected to improve the fitness objective 771. According to another example embodiment, the procedure 770, after reaching values for the input attribute(s) 111 with satisfactory performance according to the fitness objective 771, may terminate and produce either the last reached values for the input attribute(s) 111 or the corresponding generated image 114 as output.

In an example embodiment, the procedure 770 may be used to compensate for remaining inaccuracy, e.g., the portion 667b (FIG. 6) of the generated distribution 667 (FIG. 6) that is incorrect, of the image generator 113 by searching for values for the input attribute(s) 111 that produce the generated image(s) 114 with the generated attributes 444 exactly or approximately equal to the specified target attributes 772, where the generated attributes 444 are not equal to the input attribute(s) 111. Further, in yet another example embodiment, the generated image(s) 114 may be structure images, the target attributes 772 may be arbitrary target attributes, and the procedure 770 may include generating the structure images with the arbitrary target attributes using meta inference.

In another example embodiment, the procedure 770 may be used to search for properties, e.g., porosity or other suitable known property types, that produce the generated image(s) 114 with specified target attributes, e.g., permeability.

In yet another example embodiment, the procedure 770 may be used to produce multiple generated images 114, where the generated images 114 have varying values for some of the specified target attributes 772, e.g., with porosity ranging from 10% to 90%, and identical values for other of the specified target attributes 772, e.g., all with a mean particle diameter of 20 microns, for non-limiting examples.

Example Implementation for Structure Engineering

What follows is an example implementation that illustrates functionality and features of embodiments.

Figure 8:
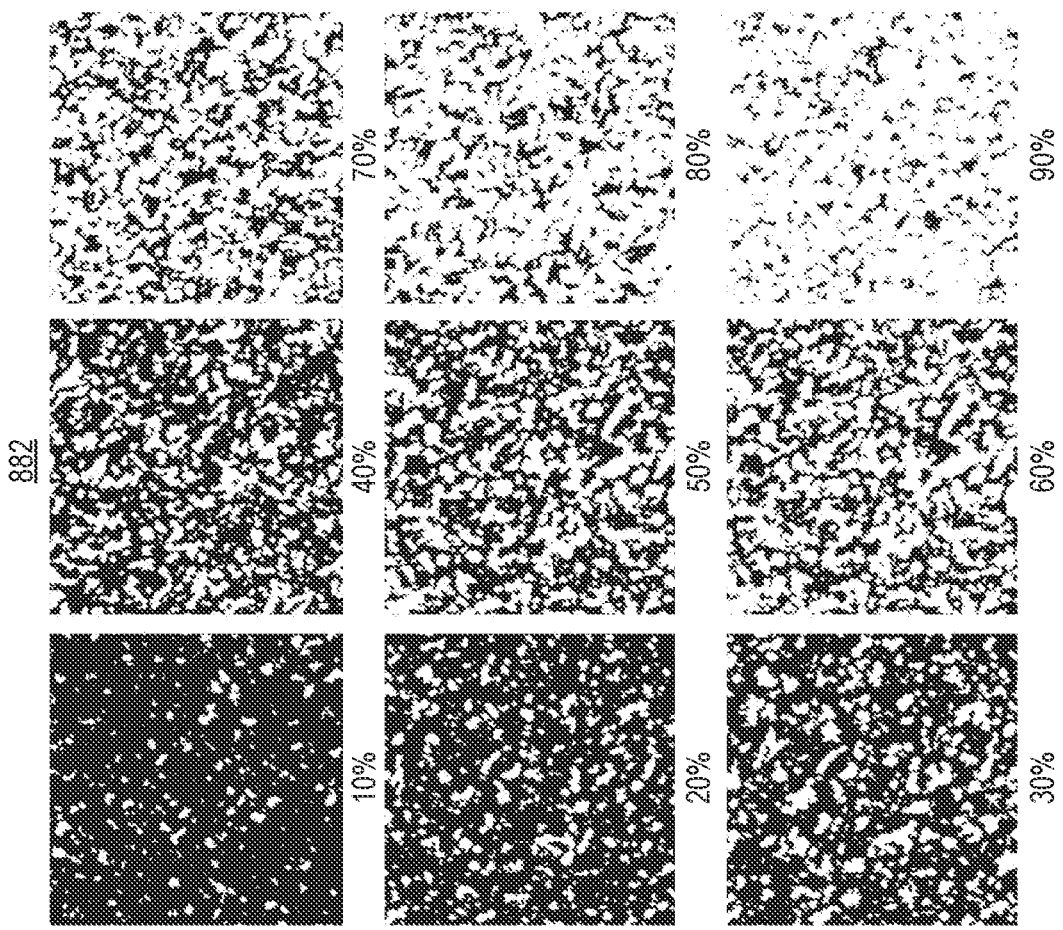
FIG. 8 is an example application of embodiments to structure engineering.

FIG. 8 illustrates example results of applying embodiments to a real-world structure engineering problem. In an example embodiment, a structure engineering problem includes finding a percolation threshold for a given plurality of similar structures, i.e., a lowest volume fraction of a material phase for which the material forms an interconnected network that connects one side of a structure to another. According to another example embodiment, if the material phase is air, it may be referred to as porosity, thus the percolation threshold may be a lowest porosity to allow fluid to flow from one side of the structure to another. In an example embodiment, for applications such as drug product development, a percolation threshold may dictate a success of therapy. According to another example embodiment, for long-acting drug products, a percolation threshold of the drug active ingredient network may need to be optimized to percolate to supply enough daily dose, while not to percolate too much to cause an overdose. Further, in yet another example embodiment, for immediate release oral solid products, a porosity network may need to be optimized to percolate enough to allow water permeation for rapid disintegration and dissolution, while not to percolate too much to impair mechanical strength and create damage from storage and transportation.

One existing procedure to determine a percolation threshold is binary search, wherein a range known to contain the percolation threshold, defined by a value known to be below the percolation threshold and another value known to be above the percolation threshold, is recursively narrowed by observations until the range is sufficiently narrow such that any value in the range is a satisfactory estimate of the true percolation threshold.

The binary search may start with a full range of possible values, i.e., porosity 0% known not to percolate, and porosity 100% known to percolate. A first recursive narrowing step may include evaluating whether a midpoint of that range, porosity 50%, allows percolation. If it does allow percolation, the percolation threshold is below 50%, so a new range is [0%, 50%], otherwise the percolation threshold is above 50%, so the new range is [50%, 100%]. In a case where 50% porosity allowed percolation, a next recursive step would test whether porosity 25% allows percolation, and if so, narrow the range to [0%, 25%], et cetera.

Notably, a size of the range at a current step determines a maximum error. For example, if the search procedure terminated after one step with a range [0%, 50%], then by taking a midpoint 25% as a final estimate, the true percolation threshold is guaranteed to be within +/−25% of the final estimate.

In practical applications, however, a 25% error margin may be unacceptably large. A much smaller error margin, such as 1% or less, may be required instead. Using the aforementioned search strategy, finding the percolation threshold with a less than 1% error may require as many as seven steps, whereas other conventional search strategies such as a linear search could require tens of steps. However, performing even seven search steps with physical samples may entail substantial or prohibitive time and monetary costs in manufacturing and experimental performance evaluation.

Embodiments can reduce a number of physical samples required to search for a percolation threshold to as little as one exemplar sample that may need to be physically made.

In FIG. 8, according to an example embodiment, an image 881 with structural features of an exemplar sample is shown. In another example embodiment, the image 881 can be a cross sectional slice of a 3D image volume (as in FIG. 8), or one of multiple 2D images from the sample. According to an example embodiment, the exemplar sample of image 881 may be one of a plurality of exemplar slices with fixed porosity attributes. In the example embodiment of FIG. 8, white may represent a material phase of interest, e.g., a dissolvable particle, while black may represent a matrix, e.g., that the particle was dispersed into and binds with through a manufacturing technique such as hot melt extrusion, or blending and compaction; other suitable known manufacturing techniques may also be used. To continue, according to an example embodiment, the exemplar sample may have a total amount of a particle phase of 40% in volume fraction, and a median particle size of 20 microns. Further, in yet another example embodiment, individual cross-sectional slices of the exemplar sample image exhibit volume fraction variation of approximately +/−5%.

Embodiments of the present disclosure were successfully utilized to generate in silico samples with particle volume fractions ranging from 10% to 90%, all with median particle size held roughly constant, i.e., maintaining approximate correctness of generated samples against hypothetical physical samples. In an example embodiment, an increment of volume fractions between 10% and 90% can be arbitrarily small, though in this practical application, 1% may be considered sufficient. According to another example embodiment, FIG. 8 shows a slice 882 from nine of such generated samples. In an example embodiment, from the generated samples, a percolation threshold was determined to be 22%. Further, in yet another example embodiment, a total time required for the automated search method according to embodiments, including optimization of and inference with an image generator (e.g., the image generator 113 of FIG. 1) but excluding manufacturing and imaging time for the single exemplar sample 881, was less than a day on consumer-grade computing hardware.

A description of another set of example embodiments follows.

Example Training Phase

Figure 9:
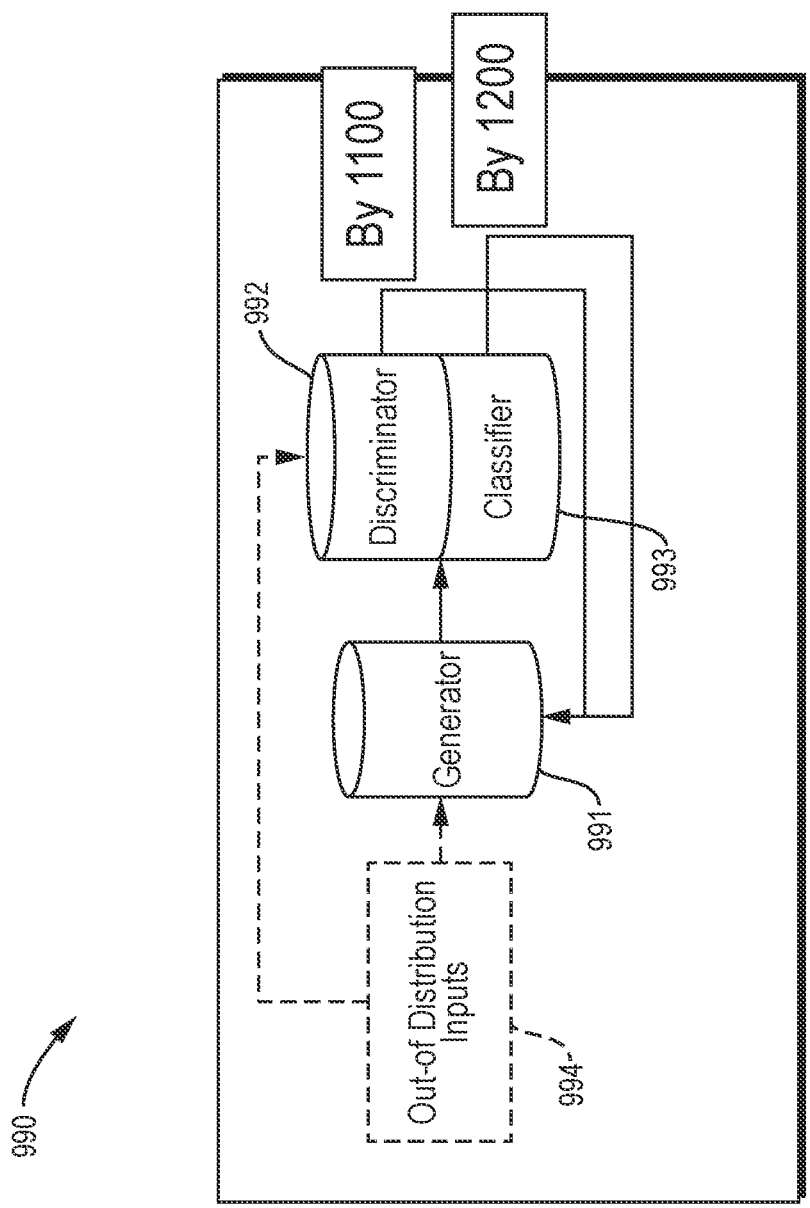
FIG. 9 is a block diagram illustrating a procedure for training a generator according to an example embodiment.

FIG. 9 is a block diagram illustrating a procedure 990 for training a generator 991 according to an example embodiment. In an example embodiment, the generator 991 may be, e.g., a first artificial neural network that produces synthetic images that are visually similar to an exemplar image dataset used in training, but with a greater variety of attributes, as selected by a user. According to another example embodiment, visual similarity, i.e., realness, of the generator 991's outputs may be evaluated by discriminator 992, which may be, e.g., a second artificial neural network, using method 1100 described hereinbelow in relation to FIG. 11. In an example embodiment, quantitative correctness of the generator 991's output, i.e., attributes of images created by the generator 991, may be computed by classifier 993, which may be, e.g., a third artificial neural network, using method 1200 described hereinbelow in relation to FIG. 12. Further, in yet another example embodiment, the discriminator 992 and the classifier 993 networks may be trained by method 1300 and/or method 1400, described hereinbelow in relation to FIG. 13 and FIG. 14, respectively.

According to an example embodiment, in executing the procedure 990 to train the generator 991, out-of-distribution inputs 994 may optionally be sampled from an out-of-distribution dataset and provided to the generator 991 and/or the discriminator 992. In another example embodiment, these out-of-distribution inputs 994 may also be optionally provided to the classifier 993. Further, in yet another example embodiment, the generator 991 may use the inputs 994 to create a synthetic, i.e., fake, image, which may be provided to the discriminator 992 and/or the classifier 993.

According to an example embodiment, using the method 1100, the discriminator 992 may compare (i) the fake image optionally produced by the generator 991 and (ii) the out-of-distributions inputs 994 to determine how well the fake image complies with the out-of-distribution inputs 994, results of this comparison may be used to improve the generator 991.

Similarly, in another example embodiment, using the method 1200, the classifier 993 may compare (i) properties, e.g., attributes, of the fake image optionally produced by the generator 991 and (ii) desired properties (as indicated by the inputs 994) to determine how well the fake image complies with the desired properties 994 and results of this comparison may be used to improve the generator 991.

Unlike a traditional Auxiliary Classifier (AC)-GAN, which may only produce samples whose attributes are represented in a training data distribution, the embodiments disclosed herein can generate images with attributes outside the training data distribution by, e.g., optimizing properties of the generator 991's outputs toward a particular, user-desired attribute, while honoring other, unconstrained attributes represented in the training dataset.

Figure 10:
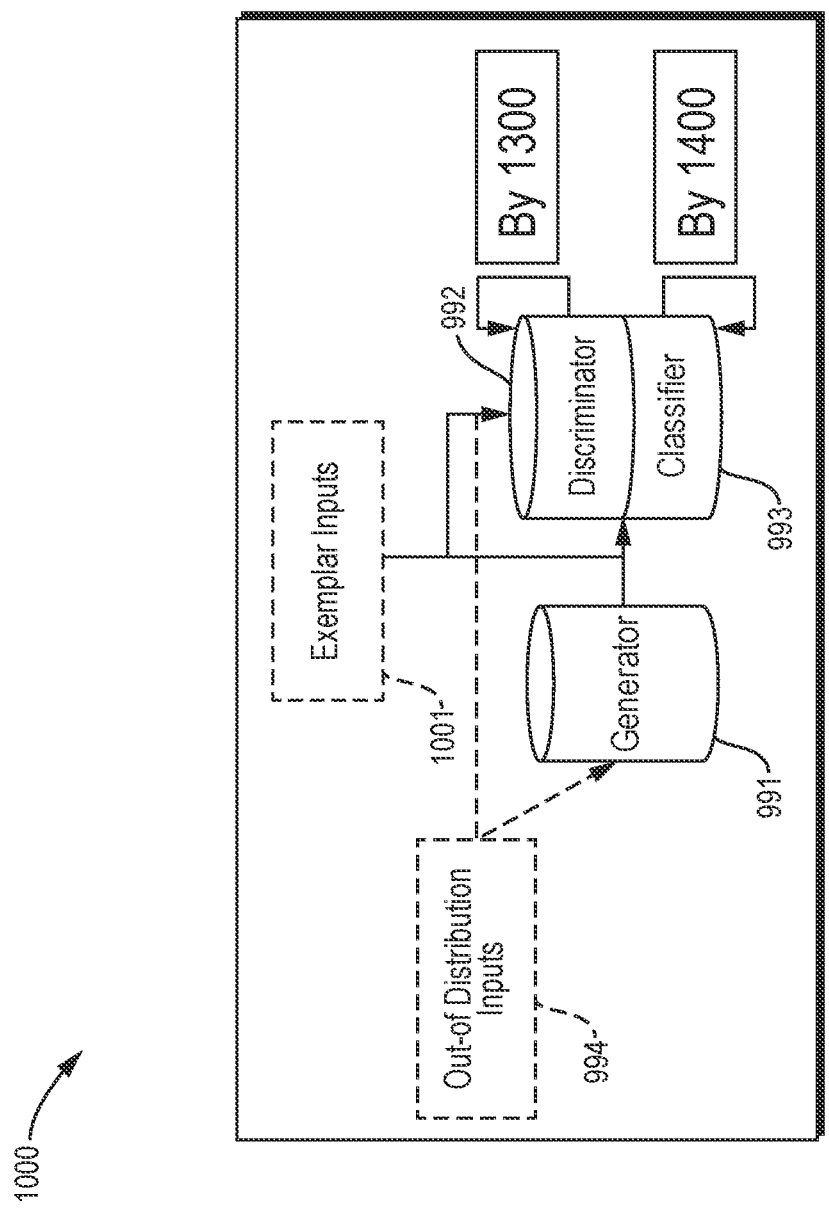
FIG. 10 is a block diagram illustrating a procedure for training a discriminator and a classifier according to an example embodiment.

While FIG. 9 illustrates the procedure 990 for training the generator 991, FIG. 10 is a block diagram illustrating a procedure 1000 for training the discriminator 992 and the classifier 993 according to an example embodiment. In an example embodiment, the procedures 990 and 1000 may be alternatively executed, i.e., the procedure 990 may be executed, then the procedure 1000, then the procedure 990, etc., until one or more criteria are met.

In the discriminator 992 and the classifier 993 training procedure 1000, in an example embodiment, the out-of-distribution inputs 994 may be optionally provided to the generator 991, the discriminator 992, and/or the classifier 993. Further, according to another example embodiment, real, i.e., exemplar, inputs 1001 may be optionally provided to the discriminator 992 and/or the classifier 993. In an example embodiment, these optional inputs (the exemplar inputs 1001 and/or the out-of-distribution inputs 994) may be used in conjunction with images created by the generator 991 to train the discriminator 992, using the method 1300, to differentiate between real images and synthetic images. Similarly, in yet another example embodiment, the optional inputs (the exemplar inputs 1001 and/or the out-of-distribution inputs 994) may be used in conjunction with images created by the generator 991 to train the classifier 993, using the method 1400, to determine attributes of images.

As described above, in an example embodiment, the generator 991 training workflow 990 may utilize the two sub-workflows 1100 and/or 1200 to optimize/update/train the generator 991 visually (1100) and/or quantitatively (1200).

Figure 11:
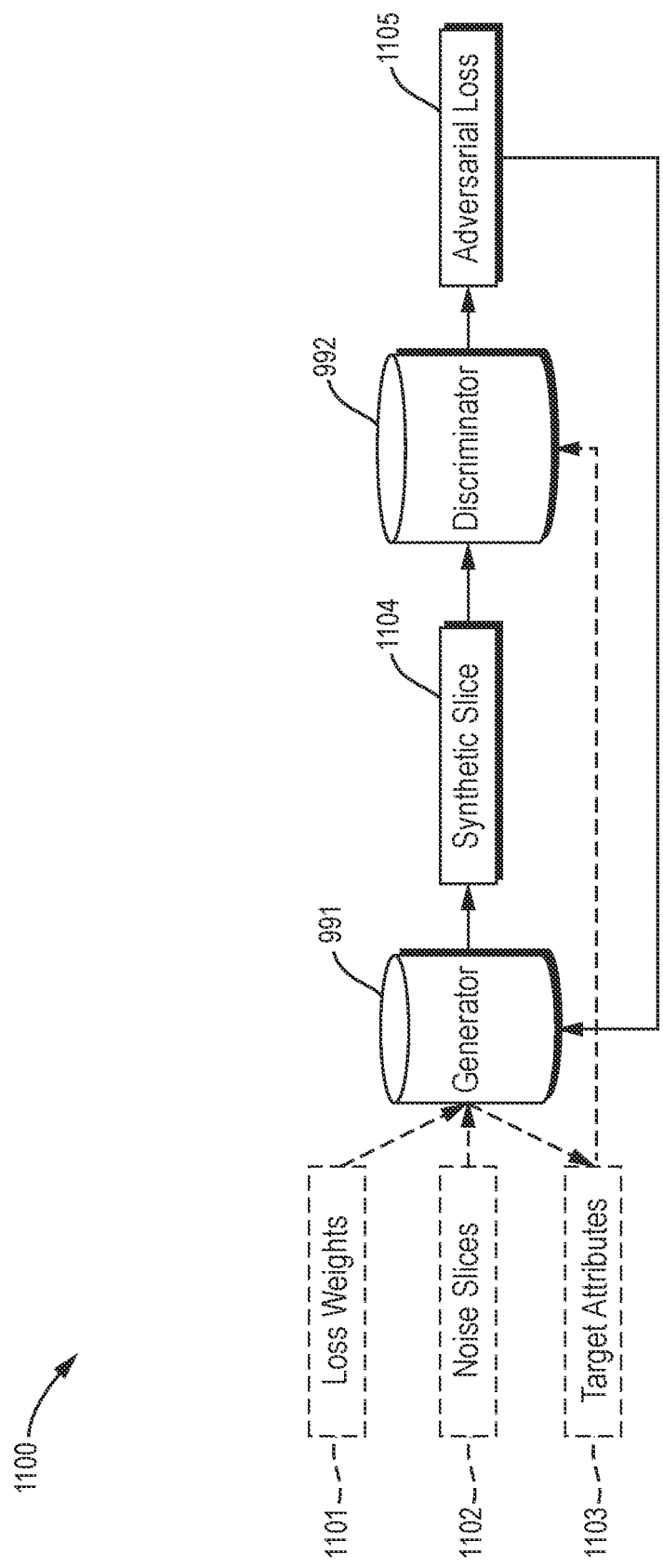
FIG. 11 is a block diagram illustrating a procedure for updating a generator for visual similarity according to an example embodiment.

FIG. 11 is a block diagram illustrating a procedure 1100 for updating the generator 991 for visual similarity according to an example embodiment. In the workflow 1100, as shown in FIG. 11, in an example embodiment, the generator 991 may take as many as three input(s): optional loss weights 1101 indicating which attributes to prioritize in case of conflicts, random noise 1102, and/or target attributes 1103 expected in output 1104. According to another example embodiment, the generator 991 may take the input(s) 1101-1103 during training and, for each combination of the input(s) 1101-1103, may generate a synthetic cross-section of a structure referred to as the synthetic, i.e., "fake" slice 1104. In an example embodiment, the procedure 1100 may continue and the synthetic slice 1104 and/or the target attributes 1103 may be input to the discriminator 992, which may generate a score 1105 indicating how visually similar the fake slice 1104 is to training data for the target attributes 1103. According to an example embodiment, when the visual similarity is low, the adversarial loss 1105 may be high. In an example embodiment, the loss 1105 may be used to adjust parameters of the generator 991 so as minimize the loss 1105. Further, in yet another example embodiment, this adversarial loss 1105 may be minimized using Stochastic Gradient Descent (SGD) or another suitable known technique so as to improve the visual similarity of the generator 991's output slices, e.g., 1104.

Figure 12:
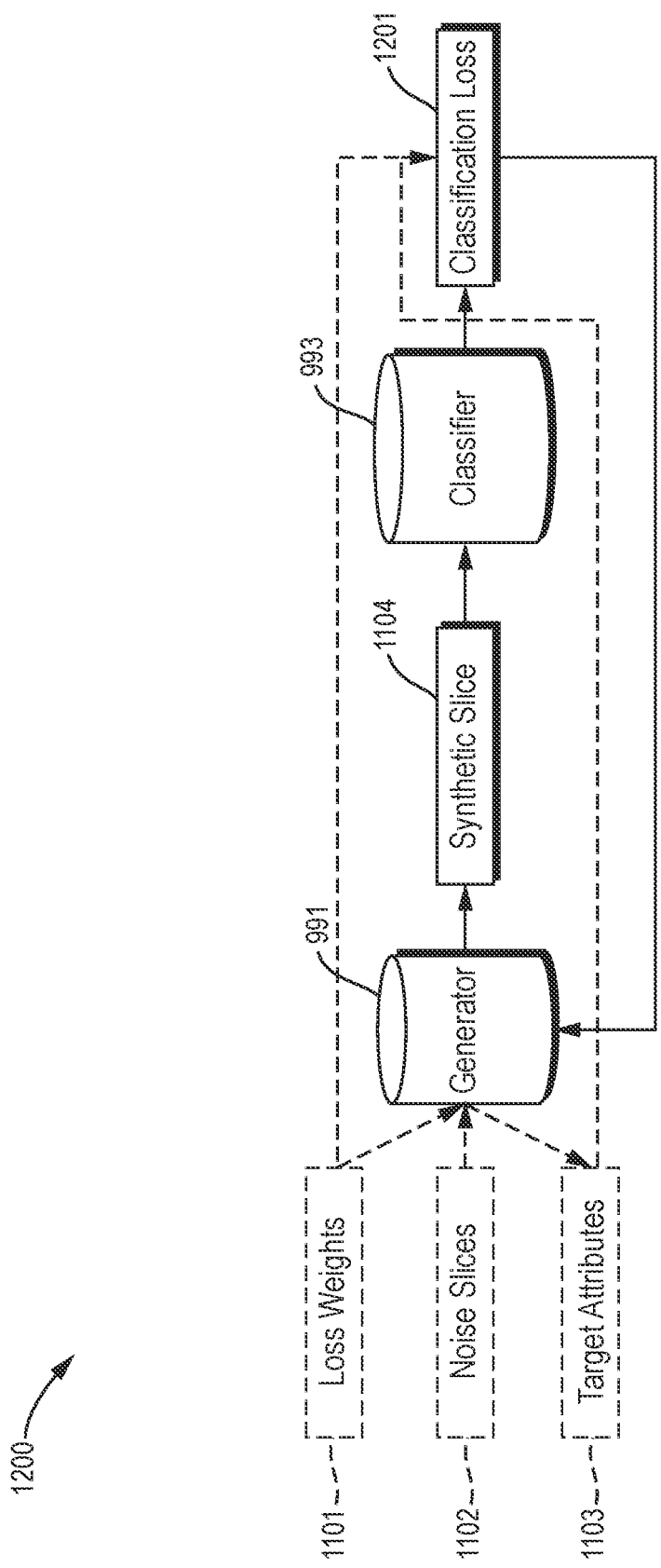
FIG. 12 is a block diagram illustrating a procedure for updating a generator for quantitative similarity in an example embodiment.

FIG. 12 is a block diagram illustrating a procedure 1200 for updating the generator 991 for quantitative similarity in an example embodiment. As shown in FIG. 12, according to an example embodiment, the workflow 1200 may begin in the same way as the workflow 1100, by taking as many as three input(s): the optional loss weights 1101 indicating which attributes to prioritize in case of conflicts, the random noise 1102, and/or the target attributes 1103 expected in the output 1104. In another example embodiment, the generator 991 may take the input(s) 1101-1103 during training and, for each combination of the input(s) 1101-1103, may generate the fake slice 1104. According to an example embodiment, the procedure 1200 may continue and the synthetic slice 1104 may be input by itself to the classifier 993, which may be, e.g., a regression classifier. In another example embodiment, the classifier 993 may approximate actual attributes of the slice 1104. According to another example embodiment, that approximation may be combined with the target attributes 1103 to select (e.g., randomly sample) the loss weights 1101 to compute total classification loss 1201. In an example embodiment, this classification loss 1201 may be used to modify parameters, e.g., weights, of the generator 991 to minimize the loss 1201. Further, in yet another example embodiment, minimizing the loss 1201 may improve accuracy of attributes of the generator 991's output, e.g., the fake slice 1104, for the target attributes 1103.

Figure 13:
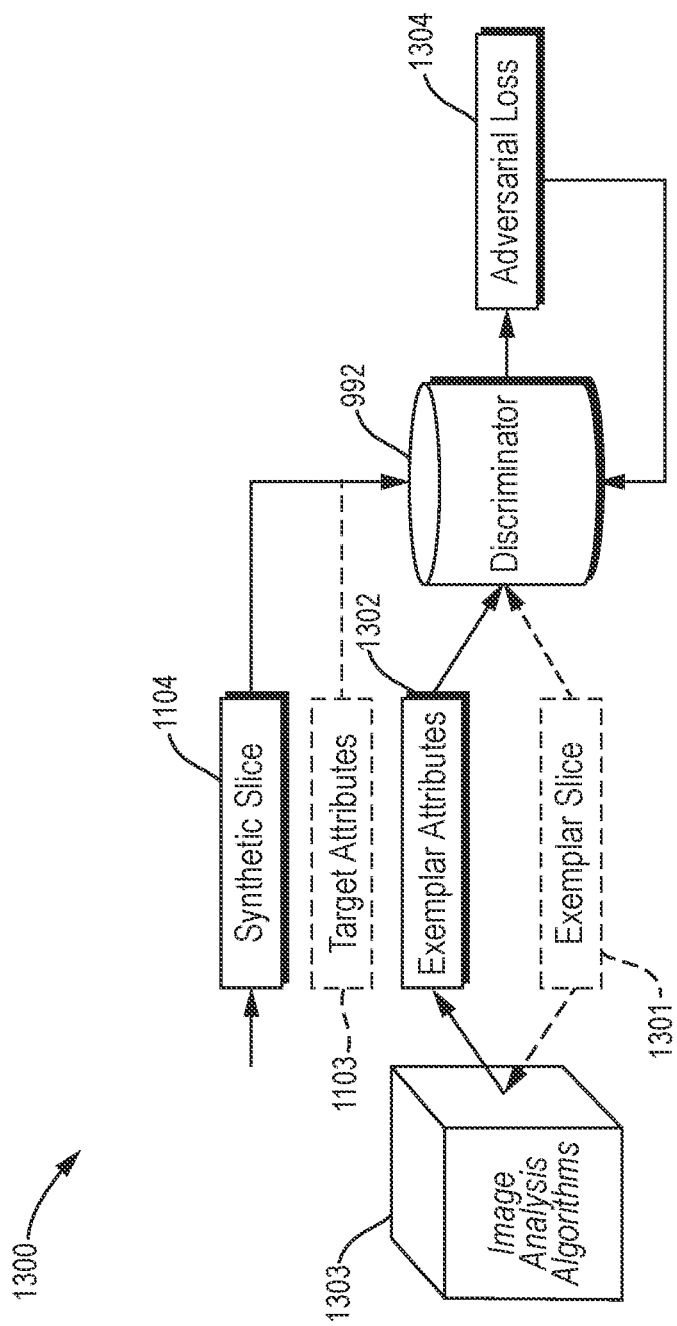
FIG. 13 is a block diagram illustrating a procedure for updating a discriminator for detecting visual similarity between exemplar and generated, i.e., synthetic, images according to an example embodiment.

FIG. 13 is a block diagram illustrating a procedure 1300 for updating the discriminator 992 for detecting visual similarity between exemplar, i.e., real, and synthetic, i.e., fake, images according to an embodiment. In the procedure 1300, according to an example embodiment, the target attributes 1103 and the synthetic slice(s) 1104 produced when updating the generator 991, e.g., using the methods 1100 and 1200 described hereinabove in relation to FIGS. 11 and 12, respectively, may be reused to update the discriminator 992, along with randomly sampled exemplar slice(s) 1301 and corresponding real attributes 1302 of the exemplar slice(s) 1301 as determined by image analysis algorithms 1303. In another example embodiment, in executing the procedure 1300, the exemplar slice 1301 may be provided to both the discriminator 992 and the image analysis block 1303. According to an example embodiment, image analysis may be performed on the real slice(s) 1301 to determine the real attributes 1302. In some embodiments, attributes determined using the image analysis techniques 1303 may be considered "real," i.e., may be considered to be ground-truth values whereas attributes determined by the classifier 993 may be considered estimated values. Further, in yet another example embodiment, these real attributes 1302 may be provided as input to the discriminator 992 along with the target attributes 1103 and the synthetic slice(s) 1104.

According to an example embodiment, the discriminator 992 may be configured to determine if a slice, e.g., the synthetic slice 1104 or the exemplar slice 1301, is real or fake. In another example embodiment, the discriminator 992 may indicate whether a slice is real or fake by outputting a score for each slice, where the output score is high for real, i.e., exemplar, slices paired with their real attributes, and the output score is low for fake, i.e., synthetic, slices paired with target attributes that were used to generate the fake slices. Thus, according to an example embodiment, in the procedure 1300, the real attributes 1302 and the exemplar slice 1301 may be analyzed by the discriminator 992 and the discriminator 992 may output a score. Likewise, in another example embodiment, the target attributes 1103 and the synthetic slice 1104 may be analyzed by the discriminator 992 and the discriminator 992 may output a score. Because this is training, according to an example embodiment, results of the scores may be known, i.e., it may be known that: (i) the score for the exemplar attributes 1302 and the exemplar slice 1301 should be high and (ii) the score for the target attributes 1103 and the synthetic slice 1104 should be low. Thus, in another example embodiment, based on the discriminator 992's scoring performance, an adversarial loss 1304 may be determined. According to an example embodiment, if the discriminator 992 performs poorly at the scoring, the discriminator 992's adversarial loss 1304 may be high and if the discriminator 992 performs well at the scoring, the discriminator 992's adversarial loss 1304 may be low. In either case, in another example embodiment, in the procedure 1300, the adversarial loss 1304 may be used to adjust parameters, e.g., weights, of, e.g., a neural network implementing the discriminator 992 so as to minimize the loss 1304. Further, in yet another example embodiment, minimizing the loss 1304 may improve the discriminator 992's ability to differentiate between the exemplar 1301 and synthetic 1104 slices.

Figure 14:
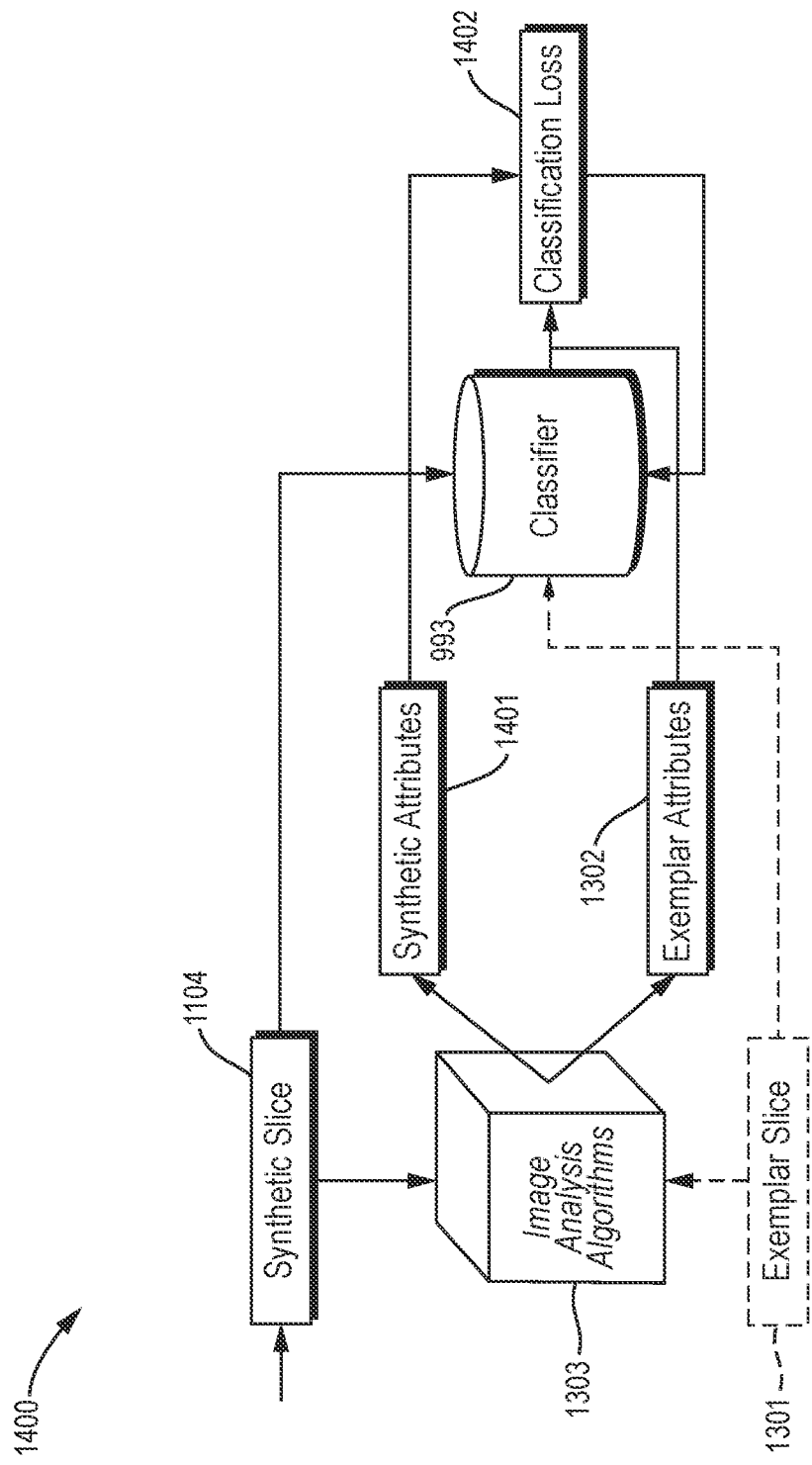
FIG. 14 is a block diagram illustrating a procedure for updating a classifier to better determine image attributes according to an example embodiment.

FIG. 14 is a block diagram illustrating a procedure 1400 for updating the classifier 993 to better determine image attributes according to an example embodiment. In an example embodiment, in the procedure 1400, the synthetic slice 1104 from the generator 991, produced when updating the generator 991, e.g., using the methods 1100 and/or 1200 described hereinabove in relation to FIGS. 11 and 12, respectively, may be reused. Likewise, according to another example embodiment, the exemplar slice 1301 and/or the exemplar attribute 1302 pairs from the method 1300 may be reused. In an example embodiment, the synthetic slice 1104 may be provided to the image analysis block 1303 and the image analysis block 1303 may determine synthetic attributes 1401 of the synthetic slice 1104 and, as such, the synthetic slice 1104's actual attributes 1401 may be determined. According to another example embodiment, the procedure 1400 may continue and only the slices, both exemplar 1301 and synthetic 1104, may be given as input to the classifier 993, which may be, e.g., a regression classifier. In an example embodiment, for each slice 1301 and 1104, the classifier 993 may output an approximation of the attributes 1401 and 1302. According to another example embodiment, a difference between these approximated attributes (attributes determined by the classifier 993 for the synthetic slice 1104 and attributes determined by the classifier 993 for the exemplar slice 1301) and the actual attribute values (attributes 1401 for the exemplar slice 1104 and attributes 1302 for the exemplar slice 1301, as determined by the image analysis algorithms 1303) may be a classification loss 1402. In an example embodiment, the classification loss 1402 may be used to adjust parameters, e.g., weights, of a neural network implementing the classifier 993 so as to minimize the loss 1402. According to another example embodiment, minimizing the loss 1402 may improve the classifier 993's ability to approximate attributes of images. In an example embodiment, the classifier 993 may produce differentiable results. Further, in yet another example embodiment, results from the classifier 993 may be differentiated so as to identify trends and determine a direction in which to modify weights of the classifier 993 during training.

According to an example embodiment, the classifier 993 may be a regression classifier. A method according to principles of the present disclosure for training the classifier 993 determines values 1302 of one or more attributes of each of a plurality of exemplar images (e.g., 1301) and, likewise, determines values 1401 of the one or more attributes of each of a plurality of synthetic images (e.g., 1104). To continue, the plurality of exemplar images 1301 and the plurality of synthetic images 1104 are processed with the neural network implemented classifier 993 to determine: (a) classifier 993 determined values of the one or more attributes of each of the plurality of exemplar images 1301 and (b) classifier 993 determined values of the one or more attributes of each of the plurality of synthetic images 1104. In turn, the classifier 993 is trained to output values of the one or more attributes of an input image based on: (i) the determined values 1401 of the one or more attributes of each of the plurality of exemplar images 1301, (ii) the determined values 1302 of the one or more attributes of each of the plurality of synthetic images 1104, (iii) the classifier determined values of the one or more attributes of each of the plurality of exemplar images 1301, and (iv) the classifier determined values of the one or more attributes of each of the plurality of synthetic images 1104.

In an embodiment, a distribution of the determined values 1401 of the one or more attributes of each of the plurality of synthetic images 1104 is outside a distribution of the determined values 1302 of the one or more attributes of each of the plurality of exemplar images 1301. According to another embodiment, a given exemplar image of the plurality of exemplar images 1301 is a camera generated image and a given synthetic image of the plurality of synthetic images 1104 is a computer-generated image. In an embodiment, at least one image, of the plurality of exemplar images 1301 and the plurality of synthetic images 1104, is an image of at least two materials dispersed into each other, a porous material, a pharmaceutical product, and a battery electrode. Example attributes (e.g., 1401 and 1302), according to an embodiment, comprise at least one of: volume fraction, particle size distribution, particle shape, porosity, connectivity, tortuosity, porosimetry, conductivity, elasticity, diffusivity, autocorrelation, and coordination number.

In an embodiment, determining the values of the one or more attributes of each of the plurality of exemplar images 1301 and each of the plurality of synthetic images 1104 comprises, processing the plurality of exemplar images 1301 using at least one image processing technique 1303 to determine the values 1302 of the one or more attributes of each of the plurality of exemplar images 1301. Likewise, such an embodiment processes the plurality of synthetic images 1104 using the at least one image processing technique 1303 to determine the values 1401 of the one or more attributes of each of the plurality of synthetic images 1104. According to an embodiment, the at least one image processing technique 1303 includes at least one of: a watershed, label statistics quantification, network graph search, distance transform, and Fourier transform.

According to an embodiment, training the classifier 993 includes computing synthetic image loss and computing exemplar image loss (collectively classification loss 1402). In such an embodiment the synthetic image loss is a difference between (i) the determined values 1401 of the one or more attributes of each of the plurality of synthetic images 1104 and (ii) the classifier 993 determined values of the one or more attributes of each of the plurality of synthetic images 1104. Similarly, the exemplar image loss is a difference between (i) the determined values 1302 of the one or more attributes of each of the plurality of exemplar images 1301 and (ii) the classifier 993 determined values of the one or more attributes of each of the plurality of exemplar images 1301. In the training, weights of the neural network implementing the classifier 993 are adjusted to lower the computed synthetic image loss and the computed exemplar image loss (collectively classification loss 1402).

As described above, an embodiment may train the generator 991, the discriminator 992, and/or the classifier 993 using the methods 990, 1000, 1100, 1200, 1300, and/or 1400, described hereinabove in relation to FIGS. 9, 10, 11, 12, 13, and 14, respectively. According to an example embodiment, a training process may include executing the procedure 1100 and the procedure 1200 together, followed by executing the procedure 1300 and the procedure 1400, together. This series of procedure execution (a process including executing the procedures 1100 and 1200 together followed by executing the procedures 1300 and 1400 together) may repeat for a preset number of steps, or until terminated by a user after examining an output image in comparison with an exemplar image, attributes of the output image and the exemplar image, and/or various loss functions.

Example Operation Phase

After training, an embodiment may discard the discriminator network 992. This is because, according to an example embodiment, the discriminator 992 may not be required for synthesizing images with the trained generator 991. In another example embodiment, the generator 991 may generate large volumes, i.e., images, in tiles so as to use less hardware resources. In this scheme, according to an example embodiment, input attributes can be different for different tiles. As long as tile size is small relative to a rate of attribute change, an output image (which may include multiple tiles) may contain minimal tiling artifacts. However, in another example embodiment, small tiles may have an increased time cost.

An embodiment implements the generator 991 using a processor and a memory with computer code instructions stored thereon, where the processor and the memory, with the computer code instructions, are configured to cause the system to provide the generator 991 implemented using a convolutional neural network (CNN) with multiple layers. In such an embodiment, each layer includes at least one channel. The image generator 991 is trained to be controlled by an input representing the desired attributes, e.g., of an exemplar image and the input is used to compute a weight and bias value for the at least one channel of each of the multiple layers of the CNN. Moreover, the image generator 991 is controlled to generate an image based upon a given input where the given input includes a sequence of numbers or sequence of matrices of numbers.

According to an embodiment, each matrix in the sequence of matrices represents values of the attributes at a corresponding location in the generated synthetic image and each matrix is used to compute the weight and bias value for the at least one channel of each of the multiple layers.

Yet another embodiment is directed to a system for generating images. The system includes a processor and a memory with computer code instructions stored thereon, where the processor and the memory, with the computer code instructions, are configured to cause the system to provide (i) a generator 991 implemented with a first neural network, (ii) a discriminator 992 implemented with a second neural network, and (iii) a regression classifier 993 implemented with a third neural network. In such an embodiment, the generator 991 is trained to receive random noise and random or user-controlled target attributes and loss weights and produce a synthetic image, where the produced synthetic image has attributes that approximate the target attributes. The discriminator 992 is trained to receive an input that includes an input synthetic image and input target attributes, or an exemplar image and actual attributes. Further, the discriminator 992 is trained to output a realness score for the input, where the realness score represents likelihood that the input is a sample from an exemplar image distribution. The regression classifier 993 is trained to receive a given synthetic image or given exemplar image and output an approximation of attributes of the given synthetic image or given exemplar image. Moreover, in the system, alternative iterative operation of the generator 991 and discriminator 992 during a training period causes the generator 991 and discriminator 992 to train in an adversarial relationship with each other and training the discriminator 992 includes training the classifier 993, e.g., to obtain both visual and quantitative sameness.

In an embodiment, the generator 991 is further configured to generate a single image with smoothly varying attributes, using one of (i) fixed tiling, (ii) adaptive tiling, and (iii) equivariant modulation, e.g., multi-scale equivariant feature modulation. According to an embodiment, multi-scale equivariant feature modulation uses different weights and biases for each feature value based on what the attributes should be at that location, i.e., tile. In another embodiment, the generator 991 is configured to generate a larger image from one or more existing, smaller images. Further still, in an example embodiment, the generator 991 is configured to generate a higher dimension image from one or more existing, lower dimension image. In yet another embodiment, the attributes of the synthetic image produced by the generator 991 correspond to, i.e., honor, at least one of: attributes of images in the exemplar image distribution and a variation of one or more of the attributes of the images in the exemplar image distribution.

For smooth attribute variation within tiles, an embodiment replaces the single attribute input with a tile of attribute input. For example, one corner of this input attribute tile might represent 40% porosity, and another corner may represent 80% porosity, with the values along the edge between those corners interpolating from those two points. This attribute tile is then resized to be applied at each layer of the generator 991, the same way that the single attribute input is resized to be applied at each layer of the generator 991.

Example Implementation for Engineering Microstructure

What follows is an example implementation that illustrates functionality and features of embodiments.

Consider an example where three users need to engineer a microstructure with a specific permeability. Each user may have control of two attributes of the microstructure, e.g., porosity and particle size (specifically, a particle size metric "D50," meaning 50% of a solid volume is filled by particles less than a certain diameter; other known metrics are also suitable). Each user's budget may allow for manufacturing, imaging, and testing only two samples. The second sample may be needed to validate a permeability of a final selection of porosity and particle size, so only one sample can be used to inform the selection of those attributes.

All three users may guess that 60% porosity and particle D50 of 20 microns will have a correct permeability. After manufacturing, imaging, and analyzing the samples, the users may find that the permeability is incorrect. With only one data point, even interpolating to find a better pair of attributes may be impossible.

Two of the users may know some traditional methods to create synthetic data from their imaged sample.

The first user may apply morphological operations "erosion" and "dilation," which increase or decrease, respectively, the porosity and particle size simultaneously. This may produce a line of data points in an attribute space. However, no point on this line may have the correct permeability, so the users may need to guess for their final sample attributes.

The second user may try "particle packing," where segmented particles are copied and pasted without overlapping from the imaged sample into a new synthetic image volume. This user can create synthetic samples with arbitrary porosities and particle sizes and may find a pair of those attributes whose synthetic volume produces the exact permeability required, in simulations. However, after confidently manufacturing, imaging, and analyzing the validation sample, the permeability may still be incorrect. The particle packing may not accurately reflect an arrangement or connectivity of particles of different sizes and at different local porosities, so the synthetic volume may not be representative of a real sample with those attributes.

The third user may have seen some well-publicized results of applying deep-learning, especially GANs, for image generation applications. The third user may understand that GANs are a powerful method not just for generating images that respect details of the images they are trained to generate, but for controlling a content of those generated images as well.

However, the user may be unsure whether GANs can be applied to the user's problem. Most publicized results may generate 2D images with a fixed size or require unbounded hardware resources to generate larger images. Such GANs may be trained on large, curated databases of diverse exemplar images. These generators may show little or no capability of generating useful images with attributes that are not either themselves represented in the training database, or an interpolation of attributes that are represented. Control of attributes may also usually be abstract. The existing approaches may not be fully applicable to the user's needs.

Then, the user may find the functionality described herein, where, from a single exemplar image, embodiments can create synthetic 3D images of arbitrary size, with attributes beyond those represented in that sample, and respect subtle differences of how particles of various sizes are arranged at different porosities within that single sample. The user may verify the correctness of a GAN against the exemplar sample by comparing the exemplar's permeability with a permeability of a synthetic volume with 60% porosity and particle D50 of 20 microns.

Then, the user may try many attribute pairs, generating volumes and computing simulated permeability on each. Eventually, the user may discover that the synthetic volume corresponding to 40% porosity and particle D50 of 30 microns has the correct simulated permeability. The sample manufactured from this attribute pair may have permeability within a required error tolerance, because the synthetic volume was sufficiently representative of reality despite not previously imaging a sample with those attributes.

Example Advantages

According to an embodiment, the generator 991 (FIG. 9) may be configured to generate larger images from one or more existing, smaller images. There is no theoretical limit to a potential output size. Moreover, the generator 991 can generate higher dimension (e.g., 3D) images from one or more existing, lower dimension (e.g., 2D) images.

An embodiment can generate images using nested GANs, which may have an alternation between two iterative optimization workflows: a generator update workflow (e.g., the procedure 990 of FIG. 9) and a discriminator update workflow (e.g., the procedure 1000 of FIG. 10), where the discriminator update workflow 1000 may include a classifier update workflow (e.g., the procedure 1400 of FIG. 14).

An embodiment can train the generator 991, e.g., a neural network, according to the generator update workflows 1100 of FIG. 11 and 1200 of FIG. 12. These workflows 1100 and 1200 can take the loss weights 1101 (FIG. 11), the random noise 1102 (FIG. 11), and/or the random or user-controlled target attributes 1103 (FIG. 11) as input(s) and produce the synthetic slice or volume 1104 (FIG. 11) (depending on the dimensions of the random noise input 1102) that is visually similar to exemplar images and with attributes that approximate the target attributes 1103 for the given weights 1101. Such functionality is a novel application of loss conditional training to conditional GANs for out-of-distribution sampling.

The discriminator 992, which may be, e.g., a neural network, according to an embodiment, may be trained according to the discriminator update workflow 1300 (FIG. 13), that takes the synthetic slice 1104 and the target attributes 1103, or the exemplar slice 1301 (FIG. 13) and the actual attributes 1302 (FIG. 13), and outputs a realness score for its input. This realness score may represent a likelihood that the input is a sample from an exemplar image distribution, e.g., a distribution from which the real slice was sampled.

In another example embodiment, the classifier 993 (FIG. 9), which may be, e.g., a regression classifier implemented with a neural network, may be trained according to the classifier update workflow 1400 that takes either the synthetic 1104 or exemplar slice 1301 and outputs an approximation of its actual attributes. Traditional classifier GANs may only use real images to train a classifier. Advantageously, embodiments can utilize the synthetic slices 1104 to train the classifier 993 and this training may enable out-of-distribution generation, i.e., generating images with attributes outside an attribute distribution of exemplar images.

In an example embodiment, images generated by the generator 991 may honor attributes of exemplar images. In another example embodiment, the generated images may honor a variation of the attributes of the exemplar images, including volume fractions, feature (e.g., particle or pore) size distribution, and/or feature spatial distribution, amongst other examples. The variation of attributes can extend outside a range of attribute variation present in the real training data (i.e., out-of-distribution).

The generator 991 can be trained in much less time than needed to manufacture and image additional samples with varying attributes. The generator 991 can also create larger images in minutes or less. The generator 991 can smoothly vary attributes within a single generated image, using either fixed or adaptive tiling, or a novel, multi-scale equivariant feature modulator. According to such an embodiment: (i) "multi-scale" may refer to application of attribute control at each layer of a generator network, where the generator 991 may start at a coarse resolution and sequentially double the resolution until reaching an output resolution, (ii) "equivariant" may describe how shifting input to the generator 991 by some amount may produce a shift of the output. For example, when generating values for two regions independently, equivariance may guarantee that any overlapping portions of those regions will have the same output both times, and (iii) "feature modulator" may refer to how the attribute control is applied, where, for each feature, a weight and bias may be computed from the attribute to multiply and add to the current feature. Whereas prior art for conditional control may apply feature modulation using the same weight and bias for all feature values, this equivariant feature modulator may use different weights and biases for each feature value based on what the attributes should be at that location.

Computer Support

Figure 15:
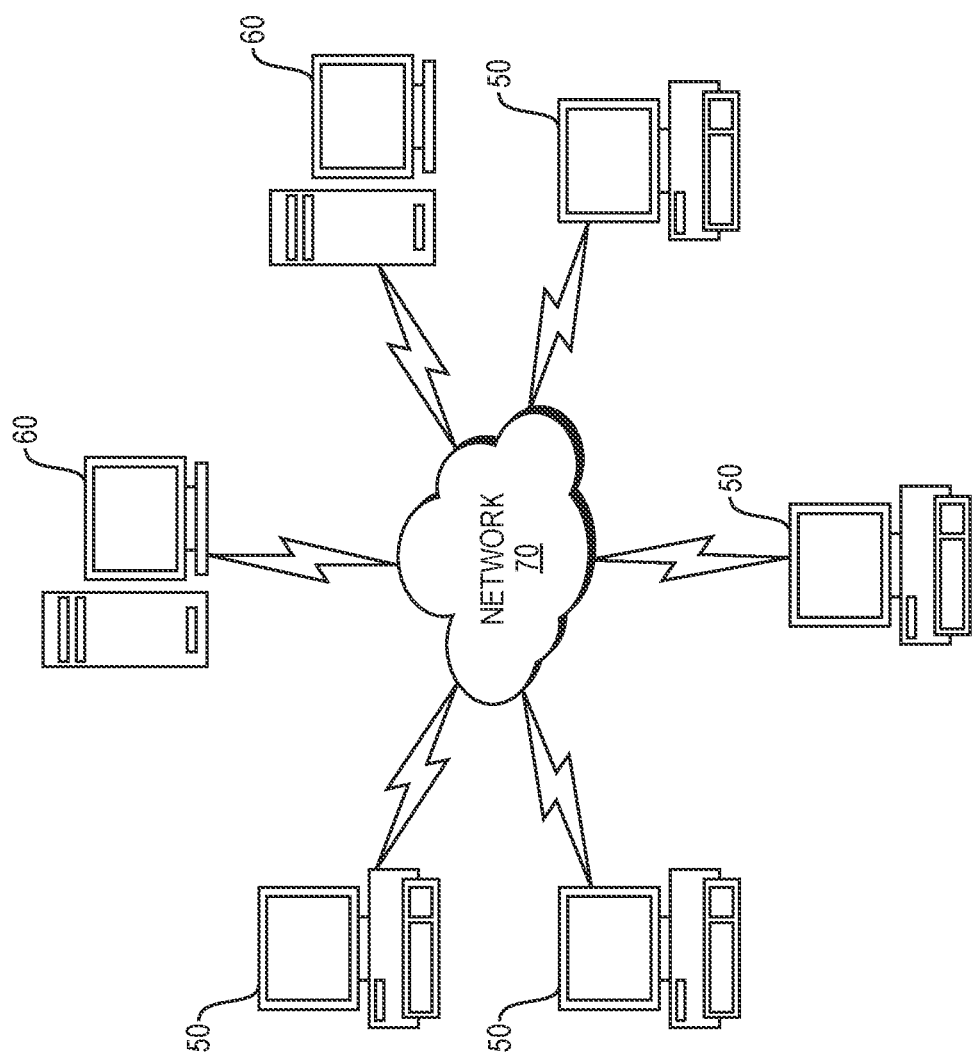
FIG. 15 illustrates a computer network, or similar digital processing environment, in which embodiments of the present invention may be implemented.

FIG. 15 illustrates a computer network or similar digital processing environment in which embodiments of the present invention may be implemented. Client computer(s)/device(s) 50 and server computer(s) 60 provide processing, storage, and input/output devices executing application programs and the like. The client computer(s)/device(s) 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 16:
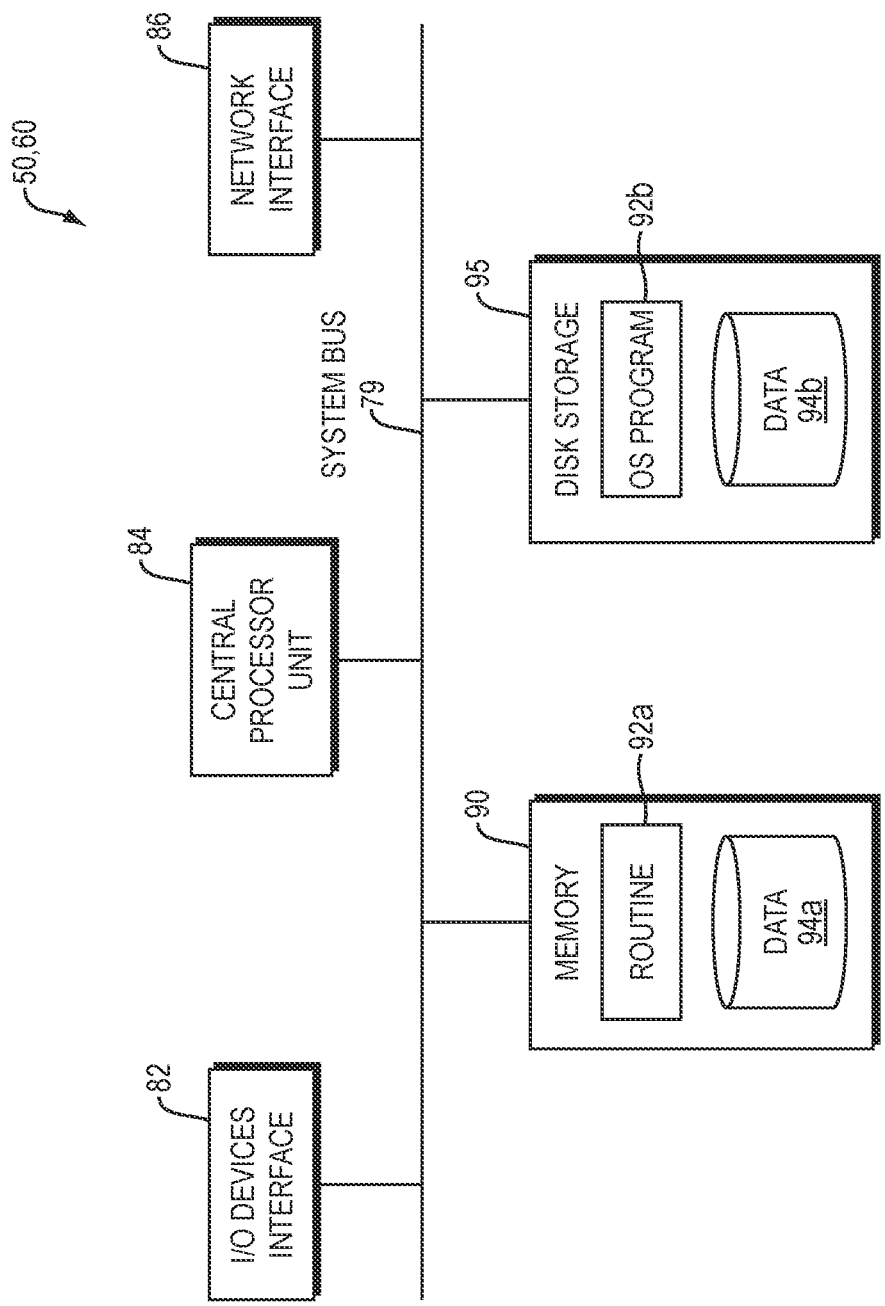
FIG. 16 is a diagram of an example internal structure of a computer (e.g., client processor/device or server computers) in the computer system of FIG. 15.

FIG. 16 is a diagram of an example internal structure of a computer (e.g., client processor/device 50 or server computers 60) in the computer system of FIG. 15. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) and enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to other various devices attached to a network (e.g., network 70 of FIG. 15). Memory 90 provides volatile storage for computer software instructions 92a and data 94a used to implement embodiments of the present invention (e.g., functionality of FIGS. 1-14, amongst others detailed herein). Disk storage 95 provides non-volatile storage for the computer software instructions 92b and the data 94b used to implement an embodiment of the present invention. A central processor unit 84 is also attached to the system bus 79 and provides for the execution of computer instructions.

In one embodiment, the processor routines 92a-b and data 94a-b are a computer program product (generally referenced as 92), including a non-transitory, computer-readable medium (e.g., a removable storage medium such as one or more internal hard drives, external hard drives, DVD-ROMs, CD-ROMs, diskettes, tapes, etc.) that provides at least a portion of the software instructions for embodiments. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other networks. In one embodiment, the propagated signal is a signal that is transmitted over the propagation medium over a period of time, such as the instructions for a software application sent in packets over a network over a period of milliseconds, seconds, minutes, or longer.

In other embodiments, the program product 92 may be implemented as a so-called Software as a Service (SaaS), or other installation or communication supporting end-users.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

[1] Heeger D J, Bergen J R. Pyramid-Based Texture Analysis/Synthesis. Proceedings of SIGGRAPH 1995, 229-238.
[2] Wei L Y, Levoy M. Fast Texture Synthesis using Tree-structured Vector Quantization. SIGGRAPH 2000.
[3] Gatys L A, Ecker, A S, Bethge M. A Neural Algorithm of Artistic Style. arXiv:1508.06576v2.
[4] Cohen M F, Shade J, Hiller S, Deussen O. Wang Tiles for Image and Texture Generation. ACM Trans. Graph. 22, 3 (2003), 287-294.
[5] Goodfellow I J, Pouget-Abadie J, Mirza M, Xu B, Warde-Farley D, Ozair S, Courville A, Bengio Y. Generative Adversarial Nets. arXiv:1406.21301v1.
[6] Mirza M, Osindero S. Conditional Generative Adversarial Nets. arXiv:1411.1784v1.
[7] Karras T, Laine S, Aila T. A Style-Based Generator Architecture for Generative Adversarial Networks. arXiv: 1812.04948v3.
[8] Ding X, Wang Y, Xu Z, Welch W, Wang J. CcGAN: Continuous Conditional Generative Adversarial Networks for Image Generation. ICLR 2021.
[9] Miyato T, Koyama M. cGANs with Projection Discriminator. ICLR 2018.
[10] Chen W, Ahmed F. MO-PaDGAN: Reparameterizing Engineering Designs for Augmented Multi-Objective Optimization. arXiv:2009.07110v3.
[11] Nobari A H, Chen W, Ahmed F. PcDGAN: A Continuous Conditional Diverse Generative Adversarial Network for Inverse Design. arXiv:2106.03620v1.
[12] Zhou Y, Zhu Z, Lischinksi D, Cohen-Or D, Huang H. Non-Stationary Texture Synthesis by Adversarial Expansion. ACM Trans. Graph. 37, 4 (2018) #49.
[13] Bergmann U, Jetchev N, Vollgraf, R. Learning Texture Manifolds with the Periodic Spatial GAN. arXiv: 1705.06566v.
[14] Gutierrez J, Rabin J, Galerne B, Hurtut T. On Demand Solid Texture Synthesis Using Deep 3D Networks. arXiv: 2001.04528v1.
[15] Zhao X, Guo J, Wang L, Li F, Zheng J, Yang B. STS-GAN: Can We Synthesize Solid Texture with High Fidelity from Arbitrary Exemplars? arXiv:2102.03973v.
[16] S. Zhang. System and methods for computing drug controlled release performance using images. U.S. Pat. No. 11,081,212 B2. United States Patent and Trademark Office. Filed Oct. 5, 2018. Awarded Aug. 3, 2021.
[17] Dosovitskiy A, Djolonga J. You Only Train Once: Loss-Conditional Training of Deep Networks. ICLR 2020.

What is claimed is:

1. A method of optimizing an image generator to generate images with specified attributes of structural features, the method comprising:
selecting at least one input attribute from an input structural feature attribute distribution;
producing an output image by processing the selected at least one input attribute with the image generator;
determining a similarity score of the output image by processing the output image based on a similarity objective, wherein the determined similarity score represents qualitative similarity of the output image to a plurality of exemplar images;
determining an attribute score of the output image by processing the output image and the selected at least one input attribute based on an attribute objective, wherein the determined attribute score represents quantitative similarity of attributes of the output image to the selected at least one input attribute;
based on the determined similarity score and the determined attribute score, optimizing the image generator to produce images, based on the selected at least one input attribute, with increased similarity scores and attribute scores; and
iterating the selecting, producing, determining the similarity score, determining the attribute score, and optimizing until a threshold is met.

2. The method of claim 1, wherein at least one of:
the input structural feature attribute distribution is outside a structural feature attribute distribution of the plurality of exemplar images; and
structural feature attributes of the output image are outside the structural feature attribute distribution of the plurality of exemplar images.

3. The method of claim 1, wherein determining the attribute score of the output image by processing the output image and the selected at least one input attribute comprises:
processing the output image with a classifier to determine classifier estimated values of the attributes of the output image; and
processing the classifier estimated values of the attributes of the output image and the selected at least one input attribute based on the attribute objective to determine classification loss representing inaccuracy of the output image to the selected at least one input attribute, wherein the classification loss is the determined attribute score.

4. The method of claim 3, wherein the classifier is a regression classifier.

5. The method of claim 3, further comprising optimizing the classifier by:
determining values of one or more attributes of each of the plurality of exemplar images;
determining values of the one or more attributes of each of a plurality of generated images;
processing the plurality of exemplar images and the plurality of generated images with the classifier to produce (a) classifier estimated values of the one or more attributes of each of the plurality of exemplar images and (b) classifier estimated values of the one or more attributes of each of the plurality of generated images; and
based on (i) the determined values of the one or more attributes of each of the plurality of exemplar images, (ii) the determined values of the one or more attributes of each of the plurality of generated images, (iii) the classifier estimated values of the one or more attributes of each of the plurality of exemplar images, and (iv) the classifier estimated values of the one or more attributes of each of the plurality of generated images, optimizing the classifier to improve accuracy of (a) the classifier estimated values of the one or more attributes of each of the plurality of exemplar images and the classifier estimated values of the one or more attributes of each of the plurality of generated images, compared to (b) the determined values of the one or more attributes of each of the plurality of exemplar images and the determined values of the one or more attributes of each of the plurality of generated images.

6. The method of claim 1, wherein determining the similarity score of the output image by processing the output image based on the similarity objective comprises:
processing the output image with a discriminator to determine an estimated likelihood value for the output image, wherein the estimated likelihood value represents a probability that the output image belongs to a same distribution as the plurality of exemplar images; and
processing the estimated likelihood value based on the similarity objective to determine adversarial loss for the image generator, wherein the determined adversarial loss is the determined similarity score.

7. The method of claim 6, wherein the discriminator is a conditional discriminator and the method further comprises:
processing both the output image and the selected at least one input attribute to determine the estimated likelihood value, wherein the estimated likelihood value further represents a probability that the output image belongs to a distribution of a subset of the plurality of exemplar images, where exemplar images in the subset have attributes similar to the selected at least one input attribute.

8. The method of claim 6, further comprising optimizing the discriminator by:
determining values of one or more attributes of each of the plurality of exemplar images;
processing each of the plurality of exemplar images paired with the determined values of the one or more attributes of each exemplar image, with the discriminator to produce a similarity score for each of the plurality of exemplar images;
processing a plurality of generated images, each of the plurality of generated images paired with at least one input attribute used to produce the plurality of generated images, with the discriminator to produce a similarity score for each of the plurality of generated images; and
based on the discriminator produced similarity score for each of the plurality of generated images and the discriminator produced similarity score for each of the plurality of exemplar images, optimizing the discriminator to reduce the similarity score for each of the plurality of generated images and increase the similarity score for each of the plurality of exemplar images.

9. The method of claim 1, further comprising:
optimizing input attributes to the image generator, wherein processing the optimized input attributes with the image generator produces an image with a specified value for at least one target attribute.

10. The method of claim 9, wherein optimizing the input attributes comprises:
producing a given image by processing the at least one target attribute, at a given value, with the image generator;

processing the given image to determine a value of the at least one target attribute for the given image;

based on the determined value of the at least one target attribute for the given image and the specified value for the at least one target attribute, determining a fitness score representing similarity of the determined value of the at least one target attribute to the specified value;

based on (i) the determined value of the at least one target attribute, (ii) the specified value for the at least one target attribute, and (iii) the determined fitness score, determining a new value of the at least one target attribute, wherein the new value improves the fitness score; and iterating the producing the given image, processing the given image, determining the fitness score, and determining the new value until the image with the specified value for at the least one target attribute is produced.

11. A system for generating images, the system comprising a processor and a memory with computer code instructions stored thereon, the processor and the memory, with the computer code instructions, being configured to cause the system to provide:

an image generator, wherein the image generator is configured to produce an output image based on an input attribute; and an image generator optimizer configured to optimize the image generator to produce images that are qualitatively similar to a plurality of exemplar images, wherein attributes of the produced images are quantitatively similar to user input attributes and the user input attributes are outside of exact values and interpolated ranges of values of attributes of the plurality of exemplar images.

12. The system of claim 11 wherein:

attributes of the output image are both qualitatively similar to the plurality of exemplar images and quantitatively similar to the input attribute.

13. The system of claim 11, wherein the image generator is further configured to generate a single image with smoothly varying attributes based on at least one of: (i) fixed tiling and (ii) adaptive tiling.

14. The system of claim 11, wherein at least one of:

the image generator is configured to generate at least one output image larger than at least one image of the plurality of exemplar images; and the image generator is configured to generate at least one output image with higher dimensionality than at least one image of the plurality of exemplar images.

15. The system of claim 11, wherein at least one of:

an image of the plurality of exemplar images is a camera generated image;

an image of the plurality of exemplar images is a computer-generated image based on at least one of: a sketch, a textural description, a synthetically created object, and a real-world object; and an image of the plurality of exemplar images is based on observations of a physical structure.

16. The system of claim 11, wherein:

the attributes of the produced images include at least one of: volume fraction, size distribution, shape distribution, connectivity, tortuosity, porosimetry, conductivity, elasticity, diffusivity, autocorrelation, and coordination number.

17. The system of claim 11, wherein the processor and the memory, with the computer code instructions, are further configured to cause the system to:

evaluate the attributes of the produced images using image processing, wherein the image processing includes at least one of: watershed segmentation, label statistics quantification, network graph search, distance transform, and Fourier transform.

18. The system of claim 11, wherein the image generator is a convolutional neural network including at least one convolution layer, where each convolution layer comprises at least one input channel and at least one output channel.

19. The system of claim 18, wherein:

the input attribute causes the convolutional neural network to produce a weight and bias value for each of the at least one output channel of each of the at least one convolution layer; and based on each weight and bias value, a transformation is applied to each output of each convolution layer.

20. A system for generating images, the system comprising a processor and a memory with computer code instructions stored thereon, the processor and the memory, with the computer code instructions, being configured to cause the system to provide:

an image generator implemented with a first neural network, the image generator configured to receive input attributes and produce an output image, wherein the output image has attributes that approximate the input attributes;

a discriminator implemented with a second neural network, the discriminator configured to produce a similarity score based on an input including an image and attributes, wherein the similarity score represents a likelihood that the image and the attributes are a sample from an exemplar distribution;

a regression classifier implemented with a third neural network, the regression classifier configured to produce an estimate of attributes of an input image; and wherein alternating iterative optimization of the image generator, discriminator, and regression classifier configures the image generator to output images that are quantitatively similar to a plurality of images from the exemplar distribution and with attributes quantitatively similar to at least one input attribute.

* * * * *